United States Patent
Khanna et al.

(10) Patent No.: US 10,901,416 B2
(45) Date of Patent: Jan. 26, 2021

(54) SCENE CREATION SYSTEM FOR AUTONOMOUS VEHICLES AND METHODS THEREOF

(71) Applicant: Honda Motor Co., Ltd., Tokyo (JP)

(72) Inventors: Rahul Khanna, Mountain View, CA (US); Yusuke Narita, Milpitas, CA (US)

(73) Assignee: Honda Motor Co., Ltd., Tokyo (JP)

(*) Notice: Subject to any disclaimer, the term of this patent is extended or adjusted under 35 U.S.C. 154(b) by 179 days.

(21) Appl. No.: 16/040,341

(22) Filed: Jul. 19, 2018

(65) Prior Publication Data
US 2020/0026278 A1   Jan. 23, 2020

(51) Int. Cl.
*G05D 1/00* (2006.01)
*B60R 1/00* (2006.01)
*G06K 9/00* (2006.01)
*G06N 3/04* (2006.01)
*G06N 3/08* (2006.01)

(52) U.S. Cl.
CPC ............ *G05D 1/0088* (2013.01); *B60R 1/00* (2013.01); *G06K 9/00664* (2013.01); *G06N 3/0454* (2013.01); *G06N 3/08* (2013.01); *B60R 2300/105* (2013.01); *B60R 2300/304* (2013.01); *G05D 2201/0213* (2013.01)

(58) Field of Classification Search
CPC ......... G05D 1/0088; G05D 2201/0213; G06K 9/00664; G06N 3/0454; G06N 3/08; B60R 2300/105; B60R 2300/304; B60R 2300/60
See application file for complete search history.

(56) References Cited

U.S. PATENT DOCUMENTS

| | | | |
|---|---|---|---|
| 8,711,224 B2* | 4/2014 | Sandler | G11B 27/034 348/157 |
| 9,426,358 B2* | 8/2016 | Lehtiniemi | H04N 21/44008 |
| 9,649,979 B2 | 5/2017 | Sakai et al. | |
| 10,198,001 B2* | 2/2019 | Shashua | G05D 1/0221 |
| 10,242,457 B1* | 3/2019 | Sibley | G09G 3/003 |

(Continued)

FOREIGN PATENT DOCUMENTS

GB   2529408 A   *   2/2016   ............... H04N 7/18

*Primary Examiner* — Rami Khatib
*Assistant Examiner* — Gabriel J Lambert
(74) *Attorney, Agent, or Firm* — American Honda Motor Co., Inc.; Aaron C. Fong

(57) ABSTRACT

This disclosure describes a vehicle system for identifying environmental objects within an operator's surroundings in a first window and removing object obstructions through a neural network in a second window to generate a rendered window, or scene, for display. As more windows are processed, the neural network may increase its understanding of the surroundings. The neural network may be a generative adversarial network (GAN) that may be trained to identify environmental objects by introducing noise data into those environmental objects. After receiving a first window from at least one camera on the vehicle, a rendered window may be created from a second window received from the at least one camera based on environmental objects identified within the first window through the GAN and removing object obstructions. The rendered window, without the object obstructions, and having superimposed environmental objects based on the GAN, may be displayed on an output device.

7 Claims, 19 Drawing Sheets

(56) References Cited

U.S. PATENT DOCUMENTS

| | | | |
|---|---|---|---|
| 10,254,760 B1* | 4/2019 | Abeloe | G06N 3/0454 |
| 10,482,669 B2* | 11/2019 | Rober | G06K 9/00671 |
| 10,586,132 B2* | 3/2020 | Schafer | G06K 9/6267 |
| 10,589,679 B1* | 3/2020 | Askeland | G06F 3/1431 |
| 2009/0088916 A1* | 4/2009 | Elgersma | G05D 1/106 |
| | | | 701/23 |
| 2009/0231432 A1 | 9/2009 | Grigsy et al. | |
| 2009/0238378 A1* | 9/2009 | Kikinis | H04N 13/296 |
| | | | 381/92 |
| 2012/0030633 A1* | 2/2012 | Fujimoto | B60K 37/02 |
| | | | 715/863 |
| 2013/0124637 A1* | 5/2013 | Ko | G06F 40/169 |
| | | | 709/205 |
| 2014/0063263 A1* | 3/2014 | Bernal | G08B 13/19645 |
| | | | 348/169 |
| 2014/0085472 A1* | 3/2014 | Lu | B60R 1/002 |
| | | | 348/148 |
| 2014/0200762 A1* | 7/2014 | Shaw | B60K 35/00 |
| | | | 701/36 |
| 2015/0054826 A1 | 2/2015 | Varga | |
| 2015/0321606 A1* | 11/2015 | Vartanian | B60R 1/00 |
| | | | 348/148 |
| 2016/0110919 A1* | 4/2016 | Hancock | G06T 15/005 |
| | | | 345/428 |
| 2016/0176346 A1* | 6/2016 | Kiehl | H04N 5/2252 |
| | | | 49/31 |
| 2016/0379411 A1* | 12/2016 | Harbach | G06K 9/00791 |
| | | | 345/633 |
| 2017/0120828 A1* | 5/2017 | Ghneim | B60W 50/10 |
| 2017/0240047 A1* | 8/2017 | Candelore | G02B 27/01 |
| 2017/0251163 A1* | 8/2017 | Ochiai | B60R 11/04 |
| 2017/0315771 A1* | 11/2017 | Kerr | H04N 7/181 |
| 2018/0066956 A1* | 3/2018 | Kim | G01C 21/365 |
| 2018/0089900 A1* | 3/2018 | Rober | B60W 10/22 |
| 2018/0093619 A1* | 4/2018 | Han | G02B 27/01 |
| 2018/0115795 A1* | 4/2018 | Chinnaiyan | H04N 21/2662 |
| 2018/0232891 A1* | 8/2018 | Kim | G06T 7/254 |
| 2018/0259960 A1* | 9/2018 | Cuban | G05D 1/0202 |
| 2018/0275658 A1* | 9/2018 | Iandola | G06K 9/6268 |
| 2018/0349527 A1* | 12/2018 | Li | B25J 9/161 |
| 2019/0051233 A1* | 2/2019 | Kweon | G02B 19/0014 |
| 2019/0122077 A1* | 4/2019 | Tsishkou | G06K 9/629 |
| 2019/0180123 A1* | 6/2019 | Yamada | H04N 7/183 |
| 2019/0213451 A1* | 7/2019 | Schafer | G06N 3/08 |
| 2019/0287282 A1* | 9/2019 | Mohan | G06T 11/00 |
| 2019/0303759 A1* | 10/2019 | Farabet | G06K 9/4628 |
| 2019/0349571 A1* | 11/2019 | Herman | H04N 13/282 |
| 2020/0017026 A1* | 1/2020 | Kumar | G06F 3/167 |
| 2020/0074735 A1* | 3/2020 | Nowakowski | B60R 1/00 |
| 2020/0151958 A1* | 5/2020 | Livneh | G06T 19/006 |
| 2020/0258480 A1* | 8/2020 | Bronder | G09G 5/38 |

* cited by examiner

SCENE CREATION SYSTEM FOR AUTONOMOUS VEHICLES AND METHODS THEREOF

BACKGROUND

In an autonomous operating vehicle, virtual reality displays surrounding an interior cabin of the vehicle may allow the operator of the vehicle to experience and interact with an immersive artificial environment such that they feel as if they were part of that environment. For example, the displays may provide a relaxing scene when the vehicle detects that the operator is stressed. Stereoscopic scenes that represent underwater oceanic settings may be provided. These scenes may create an illusion of depth with a computer system adjusting the scene content in real-time to provide the illusion of the user moving through the ocean.

Driving situational awareness may be enhanced if an operator of the vehicle were able to view outside scenery through the virtual reality displays in real-time. Such displays may remove motion sickness often associated with unrealistic views of the operator's world in which the operator has been fully immersed in. Providing full displays in real-time with obstructions, however, may cause unnecessary stress to the operator of the vehicle. Obstructions, such as other vehicles on the road, may heighten the sensitivity levels of the operator and thus may render the virtual reality displays useless.

The present disclosure provides for a scene creation system for autonomous vehicles and methods thereof that addresses the above identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle is provided that may include at least one camera, at least one output device, at least one processor, and a memory operatively coupled to the processor, the memory storing program instructions that when executed by the processor, causes the processor to perform processes. The processes may include training a neural network to identify environmental objects by introducing noise data into those environmental objects, receiving a first window from the at least one camera, generating a rendered window from a second window received from the at least one camera based on environmental objects identified within the first window through the neural network while removing object obstructions, and displaying the rendered window on the at least one output device.

In accordance with another aspect of the present disclosure, a method of scene creation for display on a vehicle is provided. The method may include training a neural network to identify environmental objects by introducing noise data into those environmental objects and receiving a first window from at least one camera. In addition, the method may include generating a rendered window from a second window received from the at least one camera based on environmental objects identified within the first window through the neural network while removing object obstructions by: creating bounding boxes around the object obstructions within the second window, eliminating an area within the bounding boxes of the second window and superimposing environmental objects defined by the neural network into the area of the second window. The method may also include displaying the rendered window on the at least one output device.

In accordance with yet another aspect of present disclosure, an autonomous vehicle is provided. The autonomous vehicle may include at least one camera, at least one output device, and a control system having a neural network trained to identify environmental objects by introducing noise data into the environmental objects, the control system receiving a first window from the at least one camera and generating a rendered window from a second window received from the at least one camera based on environmental objects identified within the first window through the neural network while removing object obstructions for display on the at least one output device.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to scene creation through a neural network. More particularly, this disclosure describes a vehicle system for identifying environmental objects within an operator's surroundings in a first window and removing object obstructions through the neural network in a second window to generate a rendered window, or scene, for display. As more windows are processed, the neural network may increase its understanding of the surroundings. In one illustrative embodiment, the neural network is a generative adversarial network (GAN) that may be trained to identify environmental objects by introducing noise data into those environmental objects. After receiving a first window from at least one camera on the vehicle, a rendered window may be created from a second window received from the at least one camera based on environmental objects identified within the first window through the GAN and removing object obstructions. The rendered window, without the object obstructions, and having superimposed environmental objects based on the GAN, may be displayed on at least one output device.

Numerous other modifications or configurations to the scene creation system and method will become apparent from the description provided below. For example, while vehicles are shown as being removed from the created scene, other objects may be eliminated, such as power lines, pedestrians, bicycles, or the like. Advantageously, the operator of the vehicle may not be distracted or distraught over object obstructions in the area. Furthermore, the operator may enjoy the scenery that may be outside their vehicle and give them a more realistic experience of their environment. Other advantages will become apparent from the description provided below.

Figure 1:
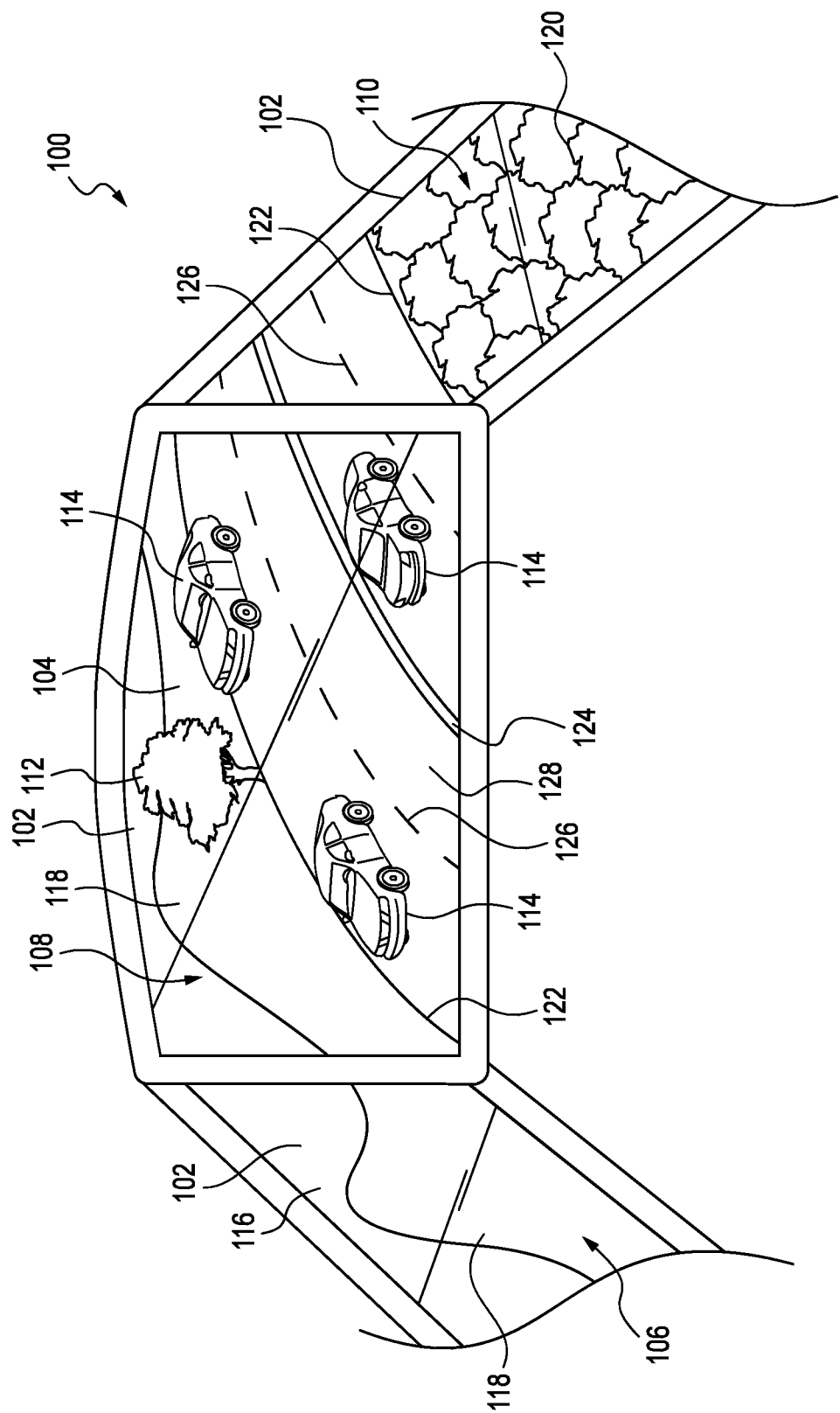
FIG. 1 is a schematic diagram of an illustrative first window from the perspective of an operator of an autonomous vehicle initially used for understanding an environment in accordance with one aspect of the present disclosure.

Turning to FIG. 1, a schematic diagram of an illustrative first window 102 from the perspective of an operator of an autonomous vehicle 100 initially used for understanding an environment 104 in accordance with one aspect of the present disclosure is provided. The first window 102 may be information collected from at least one camera on the vehicle 100 that represents outside images and/or video being taken. In this scene, the display on the first window 102 may be representative of the actual scenery for the environment 104.

The first window 102 may extend from a left portion 106, front portion 108 and right portion 110 of the vehicle 100. The first window 102 may be three separate displays providing virtual reality information, that is, virtual reality displays that are aligned with the left portion 106, front portion 108 and right portion 110. Separate cameras may be used on the outside of the vehicle 100 to generate the virtual displays. Using separate cameras may allow the vehicle 100 to achieve a wider field of view, for example, by placing the cameras at different points of view.

The shown environment 104, through the first window 102, may include a number of different objects. These environmental objects may include, but are not limited to, trees 112, other vehicles 114, sky 116, mountains 118, field 120, curbs 122, median 124, lane separators 126 and roads 128. These objects may be defined into subcategories that further define the object. For example, the object of sky 116 may be more narrowly defined based on its lighting, weather condition, or the like.

While not shown in the first window 102, other objects may also be part of the environment 104. For example, traffic signs, advertisements, posts or the like may be objects that are seen by operators of the autonomous vehicle 100. Generally, environmental objects should not be limited and are typically associated with those items found while the vehicle 100 is traversing the road 128. Many objects may be defined depending on how the GAN is trained, which will be described in further details below.

Included within the environmental objects may be object obstructions. This subset of objects may be defined for purposes of this disclosure as objects that would impede or diminish those advantages of the system as described above. That is, the object obstructions may cause distress or distraction to the operator of the vehicle 100. Further, these object obstructions may diminish the enjoyment of the vehicle 100.

For purposes of illustration, object obstructions may be other vehicles 114. These vehicles 114 may be in an opposite lane, or within the same lane. In addition, bicycles, pedestrians, motorcycles, or the like may also be considered object obstructions. In one embodiment, the operator of the autonomous vehicle 100 may be able to define what an object obstruction is defined as so that they may choose what they want to view within the vehicle 100. This may occur through a number of inputs, for example, through a touch screen, gesture recognition or the like.

Figure 2:
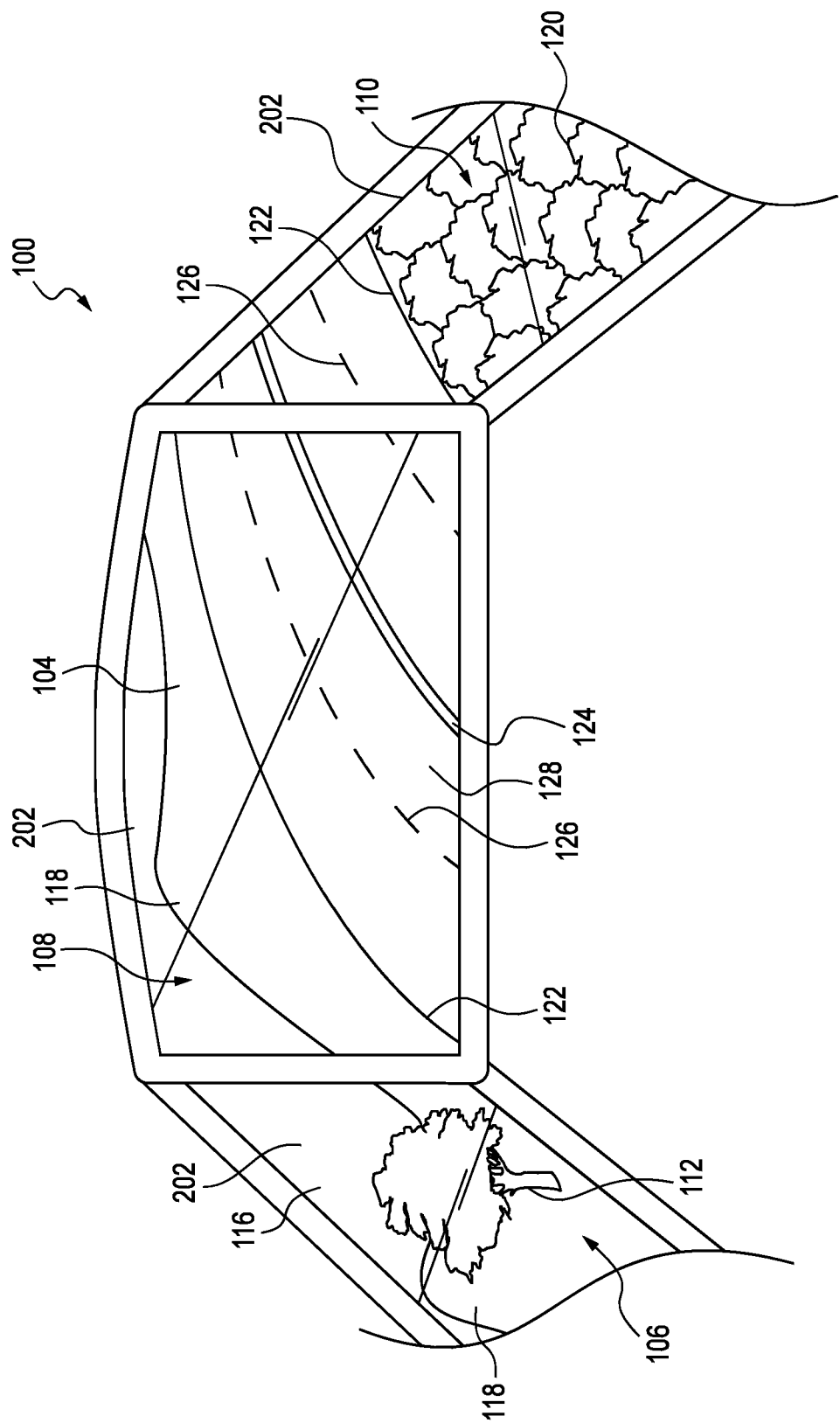
FIG. 2 is a schematic diagram of an illustrative rendered window from the perspective of the operator of the autonomous vehicle displaying a scenery created by the neural network removing object obstructions from a second window in accordance with one aspect of the present disclosure.

FIG. 2 is a schematic diagram of an illustrative rendered window 202 from the perspective of the operator of the autonomous vehicle 100 displaying a scenery created by the neural network removing object obstructions from a second window in accordance with one aspect of the present disclosure. The neural network, for purposes of the present disclosure, may be used for solving artificial intelligence problems. The neural network may use examples to automatically infer rules for recognizing objects. By increasing the number of training samples, the network may learn more about the objects, and thus improving its accuracy for object classifications. These object classifications along with the training images may then be used by the neural network to generate wholly and entirely new images, or portions thereof. GAN, which will be discussed in further details below, incorporates the use of two neural networks and is a neural network itself. GAN and neural network may be interchangeable for this disclosure, when appropriate.

Depending on the operator's selection of object obstructions or whether there have been predetermined object obstructions, the rendered window 202 may provide a view that is more relaxing and advantageously, less complex. The first window 102 may have been used to identify objects while the rendered window 202 generated from an incoming second window has removed those objects that are obstructive. The shown removal of the other vehicles 114 is for illustrative purposes and should not be construed as the only object that may be removed from the rendered window 202.

In the second window, the autonomous vehicle 100 may have traveled down the road 128 where it has passed the tree 112. The environment 104 may have changed, and because the system identified objects within the first window 102, the rendered window 202 may have been able to remove the object obstructions through the neural network. In the example, the other vehicles 114 have been eliminated from the rendered window 202.

The rendered window 202 may extend again from the left portion 106, front portion 108 and right portion 110 of the autonomous vehicle 100. Within the rendered window 202, the tree 112, now within the left portion 106, may be shown. The mountains 118 may change along the rendered window 202 as the vehicle 100 continues to be driven. The sky 116, field 120, curb 122, median 124, lane separation 126, and road 128 may also change. As the vehicle 100 progresses, the texture, color, positioning or the like for the objects may be changed based on information received from the second window as well as superimposed images defined by the neural network from the first window 102.

Figure 3:
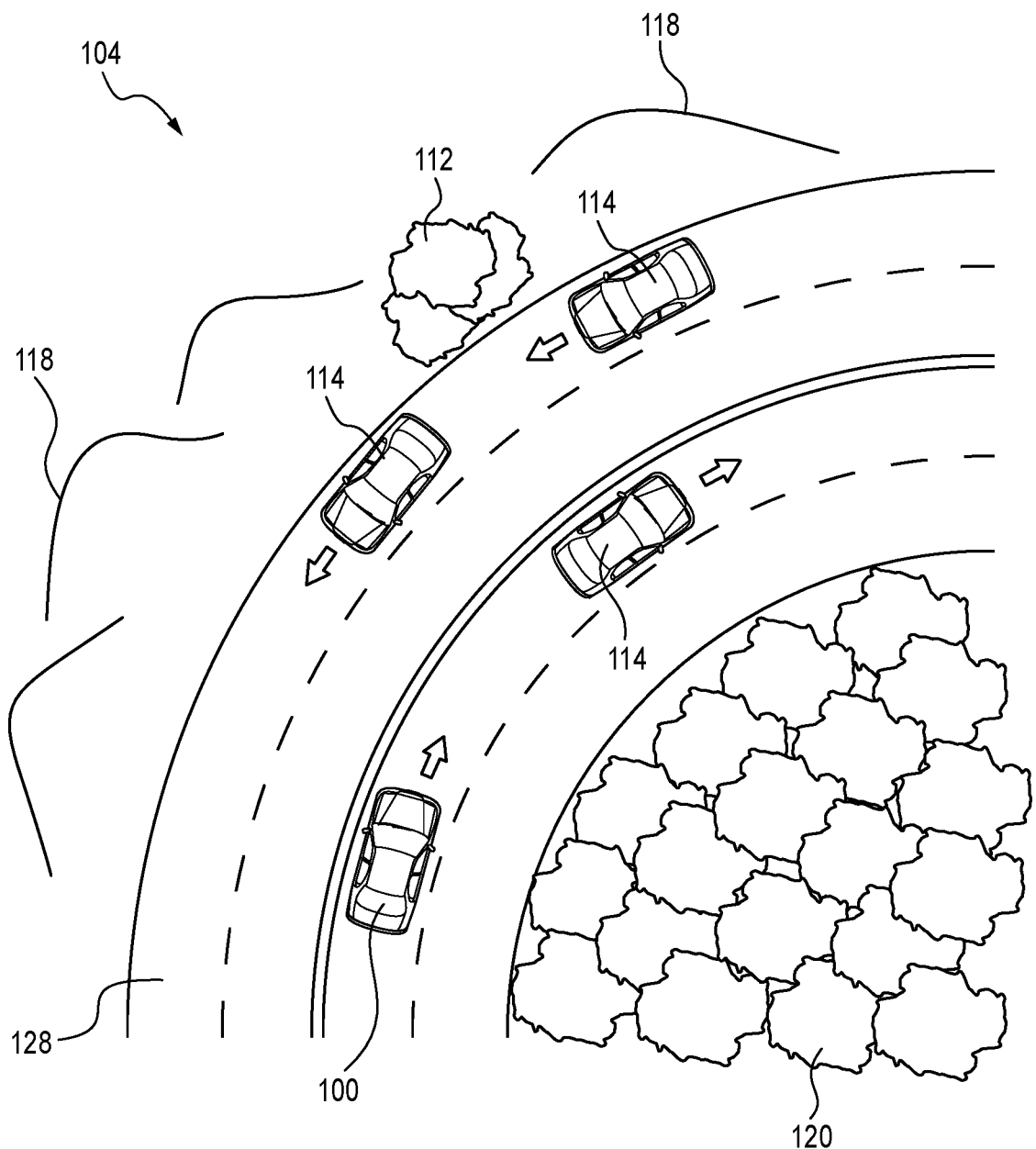
FIG. 3 is a schematic diagram of an illustrative top down view of the autonomous vehicle traversing through an environment in accordance with one aspect of the present disclosure

FIG. 3 is a schematic diagram of an illustrative top down view of the autonomous vehicle 100 traversing through the environment 104 as depicted in the first window 102 and second window in accordance with one aspect of the present disclosure. As the operator of the vehicle 100 travels along the road 128, they will pass by the mountains 118, trees 112, field 120 as well as the other vehicles 114. The first window 102 may be about object identification while the subsequent windows, including the second window, may be about further object identifications as well as scene creation in the form of rendering windows using object identifications from the previous window, or previous windows.

As will be shown below, as more windows are received from the at least one camera, additional identifications about environmental objects may be gathered to further define how to render upcoming windows for display to the operator. The at least one camera may continuously take in windows with each previous window adding to the object identifications to the current window for rendering new scenes for display. This sliding window structure thus may add new background environmental objects as each window is subsequently taken.

Figure 4:
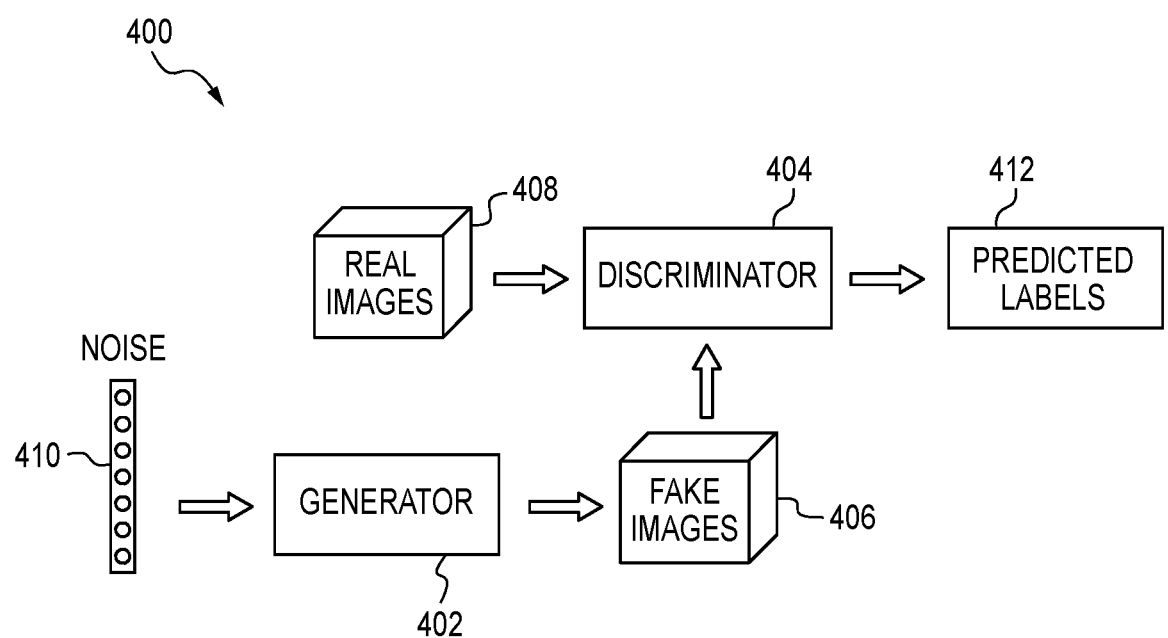
FIG. 4 is a schematic diagram of an illustrative generative adversarial network (GAN) used to create the rendered window in accordance with one aspect of the present disclosure.

In more detail, the process of removing object obstructions and rendering new scenes through training of the neural network will now be described. Referring to FIG. 4, a schematic diagram of an illustrative GAN 400 used to create the rendered window in accordance with one aspect of the present disclosure is provided. The GAN 400 may typically include, but is not limited to, three processes: interpreting real images 408 as being samples from a probability distribution; generating fake images 406; and finding the best fake image for completion through predicted labels 412. The GAN 400 may be operated on a computer system that may reside on the vehicle 100 or remotely therefrom. Further details regarding the computer system will be provided below. As described above, the GAN 400 may be itself a neural network.

In the GAN 400, one neural network, called the generator 402, may generate new data instances through a noise vector 410 to create the fake images 406. The other neural network, the discriminator 404, may evaluate both real images 408 and the fake images 406 from the generator 402 for authenticity. The discriminator 404 may decide whether each instance of data it reviews belongs to the actual training dataset or not using predicted labels 412. In the context of scene creation, the GAN 400 may be trained to identify environmental objects and within a bounding boxes described above, recreate the scene after removing the obstructive objects from the received second window to generate the rendered window 202.

For purposes of the present disclosure, but not limiting hereto, the bounding boxes may be defined as a minimum or smallest bounding or enclosing box for a point set in N dimensions. That is, a box having the smallest measure with respect to area, volume, or hypervolume in higher dimensions within which all points for an object lie. Bounding boxes may be thought of as encapsulating the particular object that may be removed through the computer system.

In one embodiment, the GAN 400 may be configured to learn a generative model that enables the GAN 400 to convert an incoming second window to the rendered window 202, that is, perform removal of object obstructions and creation of background environmental objects within the area left by the removal. The computing system may use the bounding boxes around the object obstructions as a guideline rather than an absolute truth, and the computing system may generate the rendered window by superimposing images believed to be representative of the environment 104 within the bounding box as trained in the GAN 400. Further learning may be created through environmental objects that were identified in the previous windows.

To achieve this, in one embodiment, the GAN 400 may be trained based on different types of noise to account for the complexities of the area left by removing the object obstructions. For example, the different types of noise may include complex to simple environments 104. In one embodiment, this noise may be added to account for whether a large or small amount of environmental objects exist within the environment, for example, whether the vehicle 100 is within a urban or rural setting. This noise may allow the GAN 400 to account for variations, for example, complex environments 104 such that the GAN 400 does not exactly follow the environment 104 outside the bounding boxes to generate a more natural output as a result.

In one embodiment, the noise may be introduced as a high-frequency noise illustrative of a busy environment 104 having a complex number of environmental objects. That is to say, that the environment 104 may be a complicated environment such as an urban environment 104 with a number of changing objects such as signs, lights, store fronts, or the like. In further aspects, the noise may be introduced as a low-frequency noise illustrative of an environment 104 having less objects allowing for more predictability. For example, in a rural setting where there are far fewer environmental objects to take into account of, the low-frequency noise may be used for the GAN 400. The noise may be introduced at high and low frequencies, or a combination thereof. By incorporating the different types of noise in the training data, the GAN 400 may learn that the area surrounding the removed bounding boxes of the second window is a guideline to the desired result, rather than an absolute truth.

The GAN 400 may be trained using a database of images of a plurality of environmental objects including object obstructions. For example, the database of images may include a plurality of images of a plurality of classes of vehicles 114 for object obstructions. In one embodiment, the plurality of images may be separated into a first set of training images and a second set of testing images. The classes of the vehicles 114 may include a make, a model, and a year of the vehicle. In one embodiment, the database of images of a plurality of vehicles 114 may be stored on the memory with respect to the computing system.

Further images that may be used to train the GAN 400 to identify environmental objects may include, but are not limited to, trees 112, sky 116, mountains 118, field 120, curbs 122, median 124, lane separators 126, and roads 128. Different shadowing, features and nuances of the training images may be fed into the GAN 400. Other images may include sun positions, bicycles, motorcycles or a combination of those environmental objects described herein. The GAN 400 may be trained using a database of images of other types of objects that are not environmental objects for purposes of the present disclosure.

In one embodiment, a sliding window structure may be created when incoming windows are captured by the at least one camera and new windows are rendered. That is, as the sliding window progresses from the first window 102 to the second window, second window to the third window, and so on, this information may be used to train the GAN 400. The GAN 400 may further identify environmental objects that it may not have identified beforehand. As windows continue to be received, rendered windows, or scenes, may be created based on these newly identified objects.

Using this training data, the GAN 400 may learn different relationships between elements within the environment 104 of the vehicle 100, such as spatial relationships between the different elements that have been removed when the object obstructions have been eliminated. That is, the environment surrounding the bounding boxes may be used and the GAN 400 may create relationships by compiling one or more images that match respective environmental objects outside the bounding boxes of the second window. The high frequency urban environment 104 and low frequency rural environment 104 may be noted from the scenery of the first window 102, second window, and so on. The relationship between the environmental objects, such as a continuous mountain 118, trees 112, curvature of the road 128, curbs 122 to the lane separation 126 or the like may be used to reconstruct areas over the object obstructions. In one embodiment, for example, the relationship between the sky 116 and how it is angled, weather patterns, shadowing effects or the like may be matched by the GAN 400 and understood by the training of the GAN 400 to render new windows, or scenes.

The GAN 400 may also learn other types of relationships, in accordance with aspects of the present disclosure. The computing system may generate the rendered image based on these learned relationships. The computing system may generate new features that were not previously introduced in the training data. As an example, the computing system may create a mountain that may not exist, or a road feature that may not actually be real. Other trees 112, not part of the original environment 104, may be created and displayed as part of the generated scenery in the rendered window 202.

For purposes of illustration, the GAN 400 may be thought of as a continuous learning system. Images are fed into the GAN 400 with both real images 408 and fake images 406. The GAN 400 may not initially know what environmental objects are, however, over time, and by feeding the GAN 400 training images, the GAN 400 may learn to classify the environmental objects and render new windows.

Figure 5:
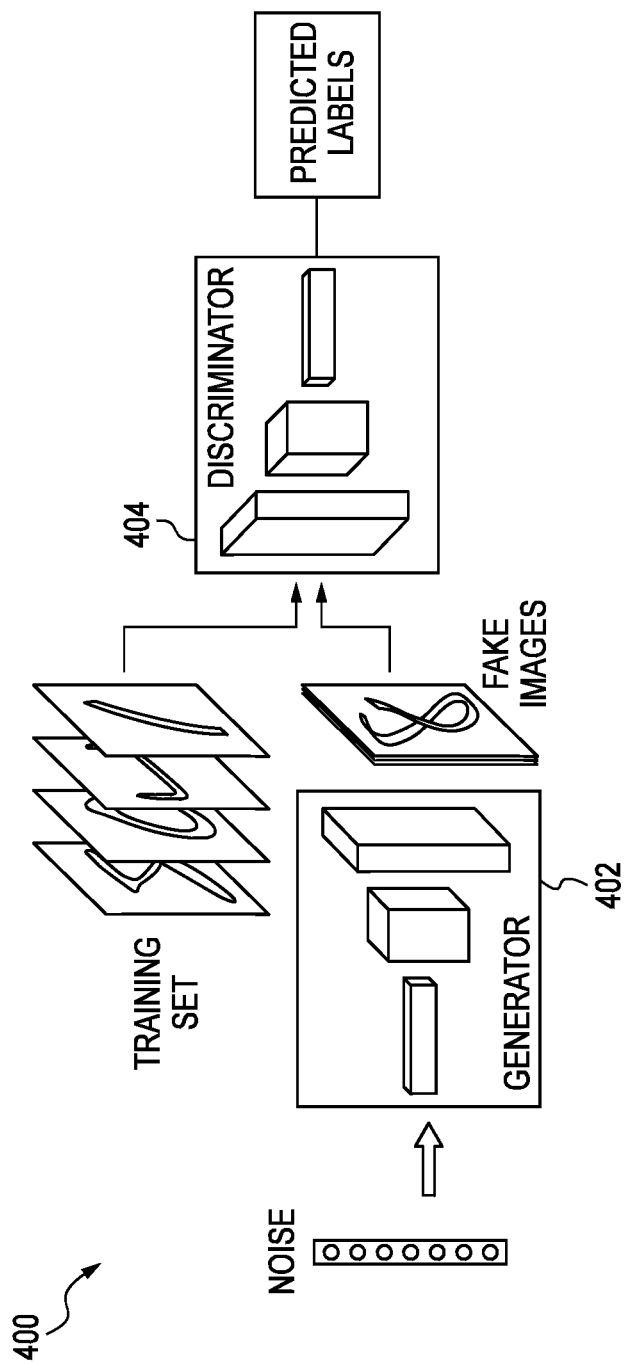
FIG. 5 is a schematic diagram of the illustrative GAN detailing training of the neural network in accordance with one aspect of the present disclosure.

FIG. 5 is a schematic diagram of the illustrative GAN 400 detailing training of the neural network in accordance with one aspect of the present disclosure. As described above, the GAN 400, which is a form of neural network, may include the generator 402 and the discriminator 404. The generator 402 and the discriminator 404 may include a plurality of layers including a combination of one or more convolutional layers, one or more pooling layers, and/or one or more deconvolutional layers.

The generator 402 may be formed using an encoder-decoder architecture. The encoder-decoder architecture may be formed as a U-Net architecture. To achieve this, one or more skip connections may be provided between each layer i and layer n-i, where n is the total number of layers of the generator 402. For example, each skip connection may concatenate each channel at layer i with a corresponding channel at layer n-i, thereby changing the number of channels in the decoder.

Each of the one or more convolution layers may be formed as 4×4 spatial filters with stride two (2). The one or more convolutional layers in the encoder and in the discriminator 404 may down-sample an input by a factor of two (2), and the one or more convolutional layers in the decoder may up-sample the input by a factor of two (2). After a final layer in the decoder, a convolution may be applied to map to a number of output channels and a Tan h (hyperbolic tangent) function may be applied to the number of output channels. After a final layer in the discriminator 404, a convolution may be applied to map to a 1-dimensional output and a Sigmoid function may be applied to the 1-dimensional output.

Upon receipt of a second window and removing the obstructive objects, the computing system may superimpose environmental objects defined by the GAN 400, or other neural network, into the area of the second window. In one embodiment, this uses the remaining environment 104 that was not removed from the bounding boxes to render the missing environmental objects. To generate the rendered image, the computing system may use indicators on the outside of the bounding boxes, that is, the remaining environmental objects left within the second window.

The computing system may detect whether the environment 104 is within an urban, semi-urban, or rural area based on the training data, and use this information as a guideline to generate the rendered image. To achieve this, the computing system may generate the rendered image using the learned relationships. For example, the computing system may insert or superimpose environmental objects defined by the neural network into the area of the second window left by the removed bounding boxes using the learned relationships when generating the rendered image. The computing system may retrieve one or more images that match or resemble the outline based on the exterior of the bounding boxes.

Furthermore, defined object identifications within previous windows may be used for drawing and/or matching the area voided by the removed object obstructions. For example, the computing system may retrieve a respective image for different elements for the outline and compile the respective images to form a composite rendered image while using those previously rendered areas for previous scenes. After generating the rendered image, the computing system may be configured to output the rendered image to the display device.

Figure 6:
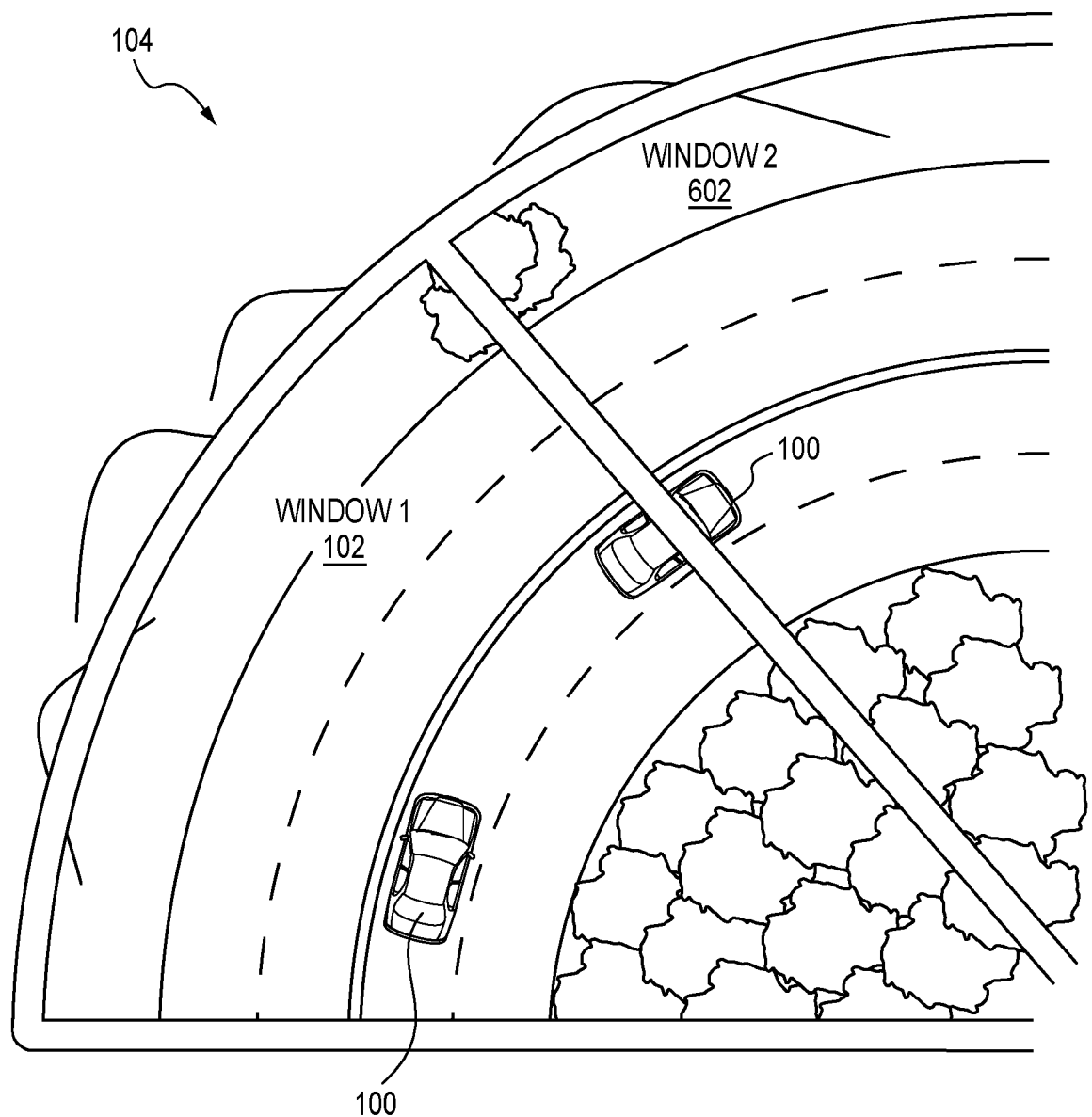
FIG. 6 is a schematic diagram of the illustrative top down view of the autonomous vehicle traversing through the environment separated into first and second windows in accordance with one aspect of the present disclosure.

Referring now to FIG. 6, a schematic diagram of the illustrative top down view of the autonomous vehicle 100 traversing through the environment 104 separated into the first window 102 and second window 602 in accordance with one aspect of the present disclosure is provided. The at least one camera on the vehicle 100 may capture video for a period of time to define these windows 102 and 602. While not shown, further windows may be captured and those presented are for purposes of illustration. As the autonomous vehicle 100 travels along the environment 104, more windows may be captured.

In one embodiment, the camera on the vehicle 100 may capture video in one minute sliding windows. This information may be fed into the GAN 400 to identify environmental objects and remove object obstructions. The first window 102, as described earlier, may be used for identifying objects within the environment 104. A background of information may be captured to understand the environment 104 when creating the rendered windows.

The second window 602 may arrive at a second minute. Object obstructions may now be identified and removed from the second window 602 with the area left by the object obstructions filled in by the GAN 400. As the vehicle travels through the environment 104, one minute windows are captured with renderings occurring after the first window 102 and displayed on the virtual reality displays. Thus, only the first window may be shown as the computer system learns what objects are within the environment 104 and then subsequent windows may be replaced with rendered windows without object obstructions. This shifting of windows may capture environmental information, remove object obstructions and recreate windows, or scenes, within those areas left by the removal.

In one embodiment, and using the shifting window structure described above, the computer system, that has been trained with the GAN 400, may be further used to narrow down the type of environment 104 that the autonomous vehicle 100 may be travelling in. Further information about the environment 104 may be understood to provide for a better generation of filling in the bounding boxes that are used to remove the object obstructions. As the GAN 400 begins to understand the environment, better understanding and image sets may be used to replace those object obstructions. In one example, a curvature of the mountain 118 may be defined as more windows are received from the at least one camera on the vehicle 100 and processed by the GAN 400. As the vehicle 100 continues to move forward from previous windows such information may be extrapolated from the environment 104 and fed into the GAN 400. The outline and features of the mountain 118 may thus be defined and anticipated through the GAN 400, or other neural network.

Figure 7:
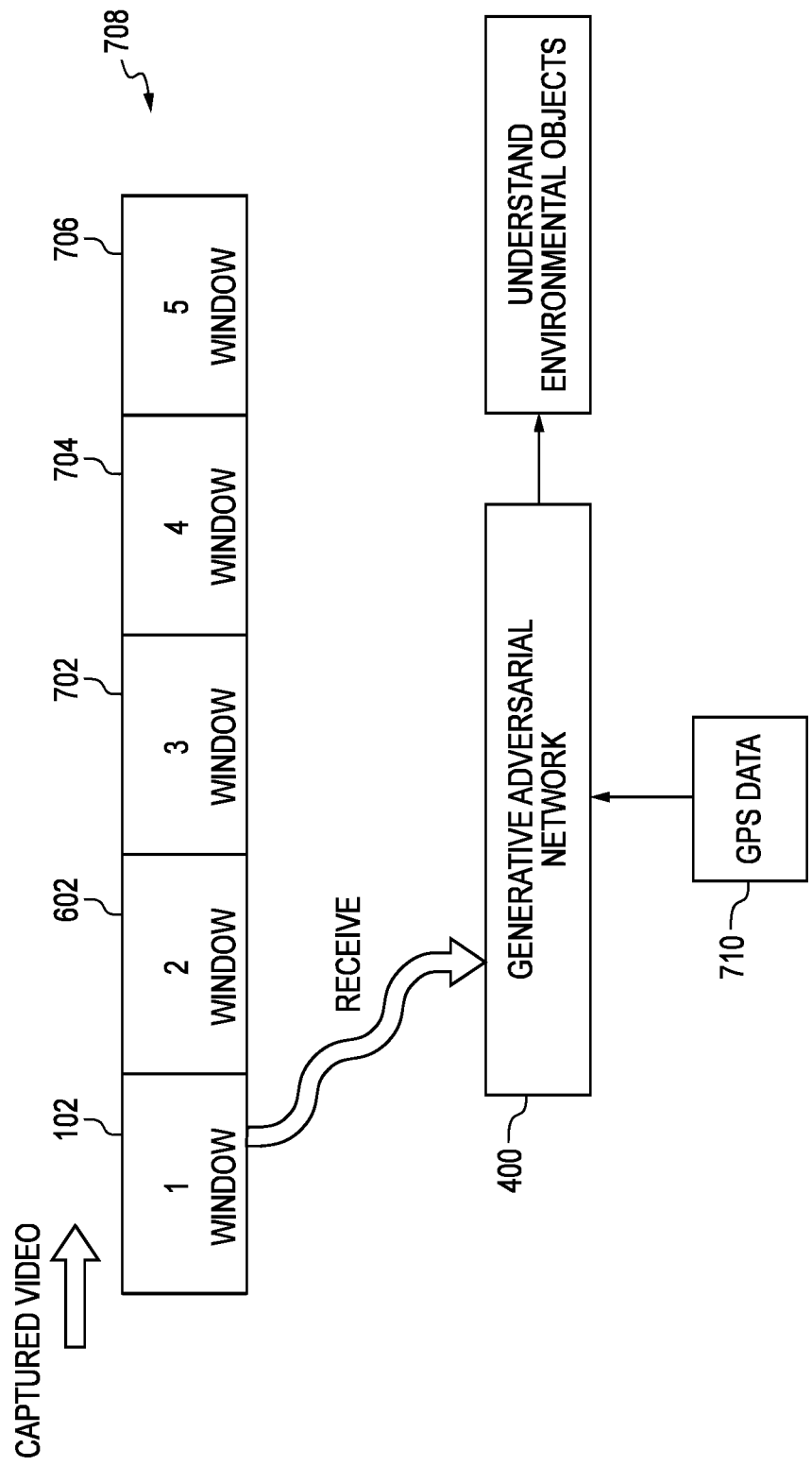
FIG. 7 is a schematic diagram of an illustrative flow showing processing of the first window to understand environmental objects in accordance with one aspect of the present disclosure.

FIG. 7 is a schematic diagram of an illustrative flow showing processing of the first window 102 to understand environmental objects in accordance with one aspect of the present disclosure. The diagram may provide a number of different windows being captured including the first window 102, second window 602, third window 702, fourth window 704, and fifth window 706 (collectively windows 708). Each of these windows 708 may be captured from the at least one camera on the vehicle 100. The windows 708 may include one minute of captured video as the vehicle traverses its environment 104. This information may be stored for processing or may be processed in real time.

Environmental objects may be processed in these increments, that is, in one minute intervals as defined by the windows 708. Processing these windows 708 may occur at the end of the intake of the windows 708, or during, such that environmental objects may be identified. The environmental objects 708 may then be used for generating the first rendered window 202, and subsequent rendered windows. As the windows 708 are processed in their increments, the environmental objects are identified along with the object obstructions.

After receiving the first window 102, the window 102 may be provided to the GAN 400 for processing. As shown, the processing includes identifying environmental objects in the first window 102. This may include, but is not limited to, trees 112, other vehicles 114, sky 116, mountains 118, field 120, curbs 122, median 124, lane separators 126 and roads 128. These may be relevant for rural environments 104. Other objects within urban environments may include power lines, telephone or power poles, store fronts, manholes, signs, street lights, pedestrians, scooters, bicycles and weather, to name a few.

Through the object identifications, the GAN 400 may later determine how to replace object obstructions after removing the area within the bounding boxes. This information may be stored or used for later and in particular, processing subsequent windows 708.

In one embodiment, global positioning system (GPS) data 710 may be used to process the environmental objects. The GPS data 710 may be received through on-vehicle systems or off-vehicle systems, such as through the operator's smartphone. The GPS data 710 may be used to correlate the detected environmental objects such that better or further processing may be performed.

To achieve this, the GAN 400 may train its data depending on the GPS coordinates. When the vehicle 100 is traversing in the area, the GAN 400 may localize the information to have a more accurate prediction of how to recreate the image from the removed object obstructions. Location information may be sent to a remote location, where the GAN 400 may process it. Alternatively, localized GAN 400 information may be stored on the vehicle 100 itself and processed thereon. A combination of local or remote processing may also be used.

Figure 8:
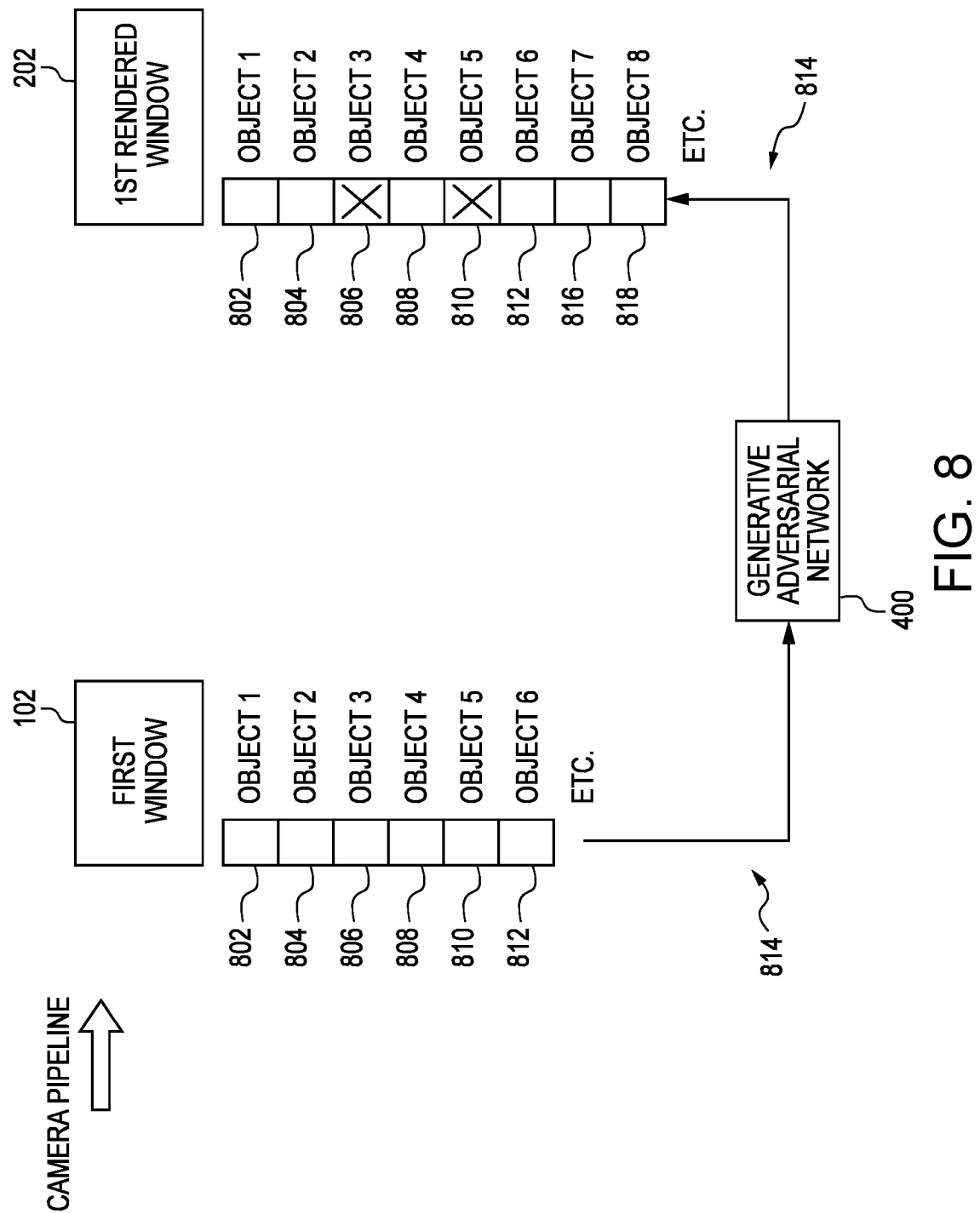
FIG. 8 is a schematic diagram of an illustrative camera pipeline showing processing of the first window through the neural network to identify environmental objects in accordance with one aspect of the present disclosure.

FIG. 8 is a schematic diagram of an illustrative camera pipeline showing processing of the first window 102 through the neural network to identify environmental objects (object 1 802, object 2 804, object 3 806, object 4 808, object 5 810 and object 6 812 (collectively objects 814)) in accordance with one aspect of the present disclosure. The objects 814 in the first window 102 may be, but are not limited to, those objects 814 that were described above for both the urban and rural environments 104. As shown, the GAN 400, or other neural network, that was trained may be used to identify these objects 814. These objects 814 may be large, medium or small and extend the entire length of the captured video or a small portion thereof.

Continuing, in the first rendered window 202, the previously identified objects 814 may be used to generate the rendered window 202. Through the GAN 400, the objects may be passed through and classified. After the processing period for the first window 102, a second window 602 may be received as discussed above. The objects 814 identified in the first window 102 may then be used to make the rendered window 202 based on the received second window 602.

To achieve this, the objects 814 may be identified in the second window 602 through the use of the GAN 400, wherein the GAN 400 previously identified the objects 814. Object obstructions may also be recognized, and in this case, object 3 806 may be recognized as another vehicle 114. In the rendered window 202, object 3 806 may be removed from the rendered window 202, as indicated by the "X". In addition, new object 7 816 and object 8 818 may be recognized. Object 5 810 may not be in the second window 602 as the vehicle 100 has travelled further and object 5 810 may no longer be in the field of view.

In the first rendered window 202, object 3 806 may be removed and filled in with renderings of images that match the bounding box that surrounded that particular object 806. Environmental objects surrounding the bounding box may be used to fill in the area that is left by removing object 3 806. Again, the GAN 400 may be used fill in the information though superimposition, that is, determining images from the GAN 400. Thus, the area is recreated from previously identified objects as well as renderings made up from previously trained images, or at least portion of those images.

Figure 9:
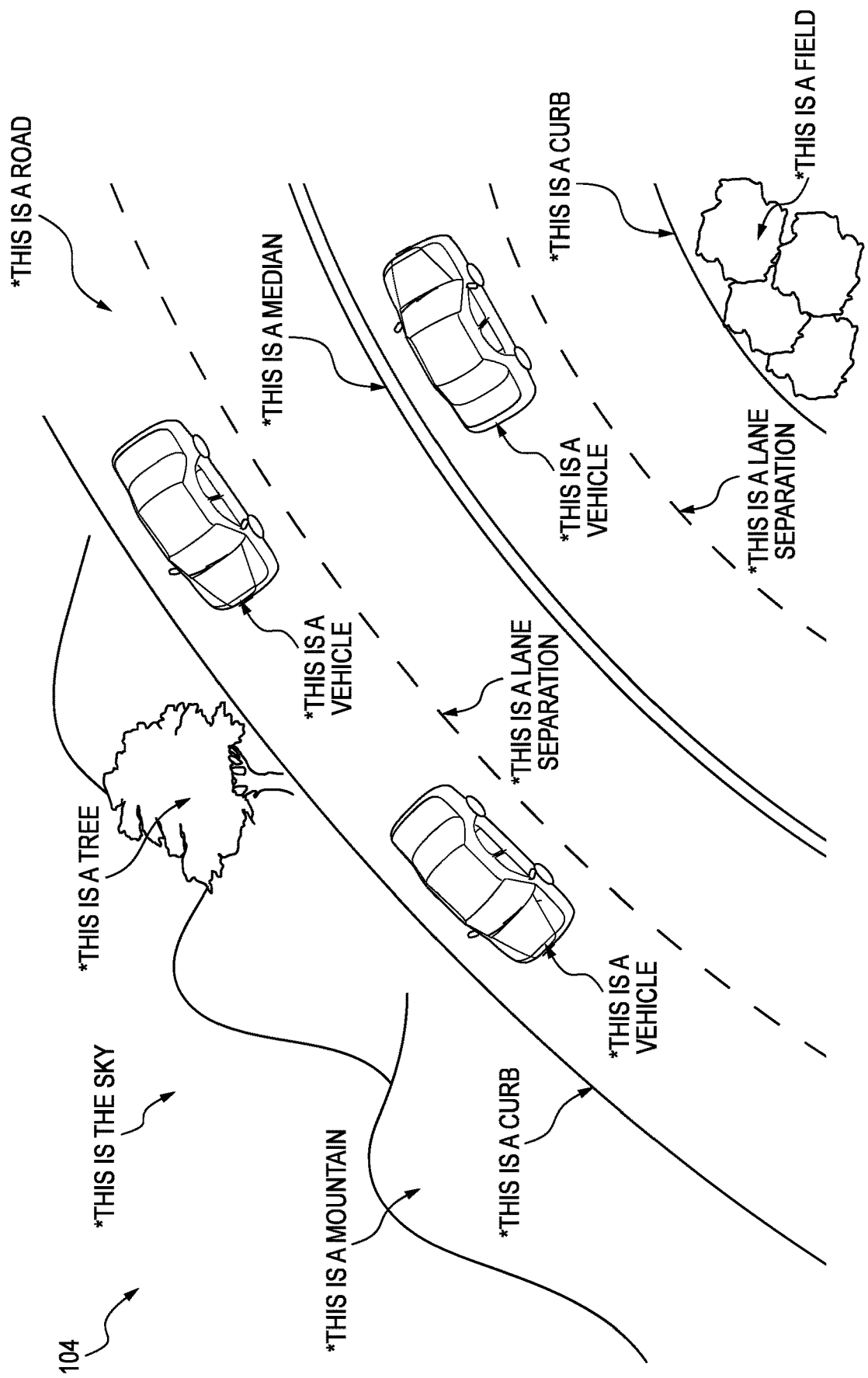
FIG. 9 is a schematic diagram of an illustrative environment where the neural network has been trained to identify objects within the first window in accordance with one aspect of the present disclosure.

FIG. 9 is a schematic diagram of an illustrative environment 104 where the neural network has been trained to identify objects 814 within the first window 102 in accordance with one aspect of the present disclosure. The training of the GAN 400, or other neural network, may be used to define those objects 814 through the classifier of the GAN 400. Other neural networks may be used to classify the objects 814, and the present disclosure is not limited to the use of only GAN 400.

Initially, the GAN 400 may not understand what an image represents. Training the GAN 400 may represent the understanding of the environmental object 814. This may include, and as discussed earlier, feeding the images into the GAN 400, including the real images 408 and fake images 406. As shown, the images may be used to train the GAN 400 to determine what a mountain looks like, or what a mountain range appears to be. Training of the GAN 400 may include many different images of mountain ranges. For example, mountains that extend and those that are singular in nature. By the first window 102, and after the training, the GAN 400 may properly identify whether the incoming images from the window 102 includes a mountain. This identification may then be used in rendering new windows, or scenes, after object obstructions have been removed.

Continuing, and as shown, other objects 814 within the first window 102 may be identified. The GAN 400 may classify and identify other objects such that typically any other object 814 that may be covered up with the object obstructions may be created through the GAN 400, or other neural network. Through this identification, the GAN 400 may piece together similar looking images to create a desired result, rather than an absolute truth.

Figure 10:
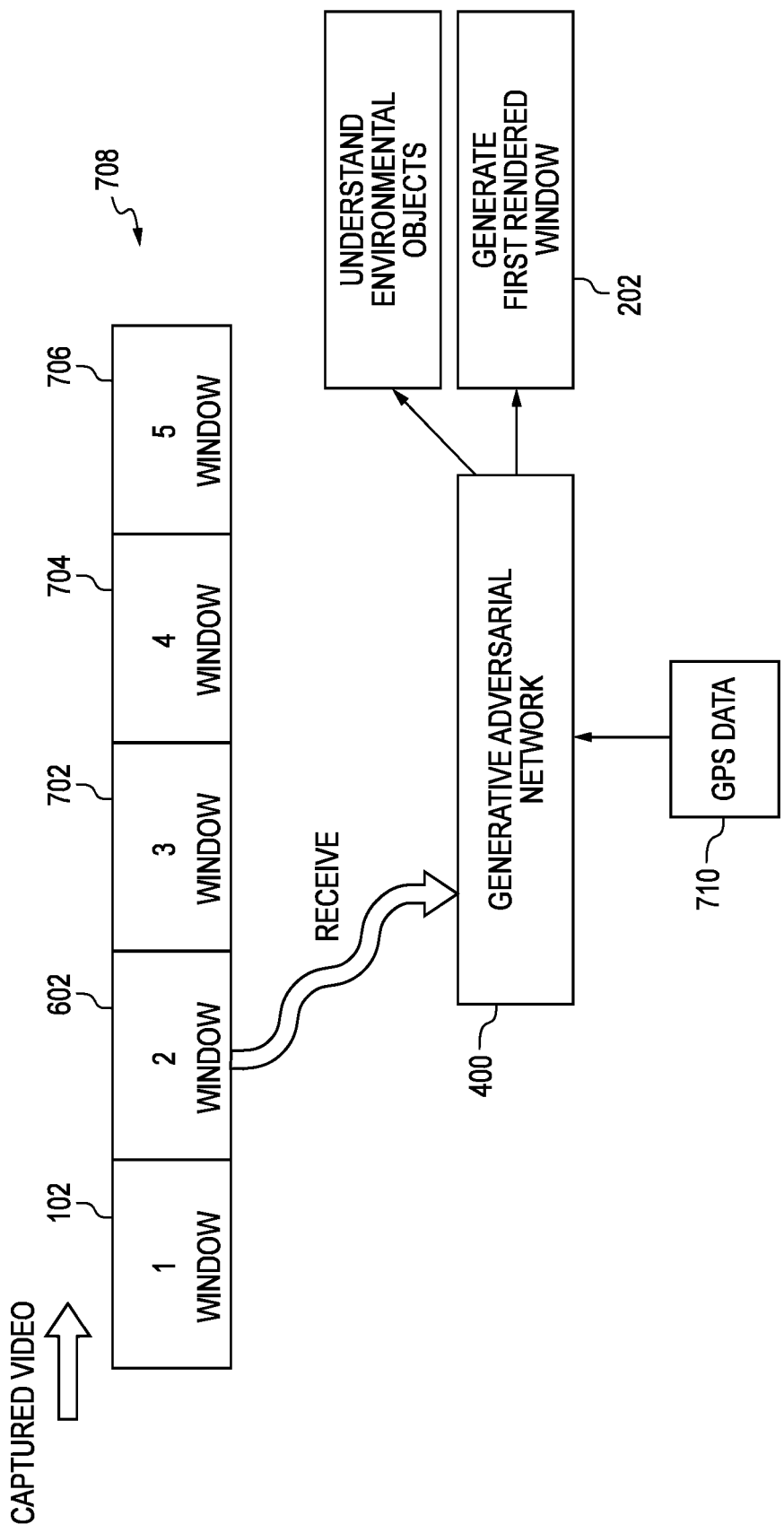
FIG. 10 is a schematic diagram of an illustrative flow showing processing of the second window to generate a first rendered window and identify environmental objects through the neural network in accordance with one aspect of the present disclosure.

FIG. 10 is a schematic diagram of an illustrative flow showing processing of the second window 602 to generate the first rendered window 202 and identify environmental objects 814 through the neural network in accordance with one aspect of the present disclosure. After the first window 102, that is the first minute of captured video, is sent, the GAN 400, or other neural network, may classify the environmental objects 814 involved. The first window 102 may be displayed in the vehicle 100 in real-time without any modification. The GAN 400, with training and the first window 102, may now know what the road 128, sky 116, scenery, terrain, position of the sun, weather or other environmental objects 814 look like and the expectations of future renderings. As described before, the GPS data 710 and localization of the roads may also be used.

After receiving the second window 602, the GAN 400, already having identified environmental objects 814, may be used to generate the first rendered window 202. The object obstructions, for example object 3 806 identified earlier, may be classified and removed within the rendered window 202. Through the previous processing of the first window 102, the GAN 400 may now more fully understand what objects 814 it is looking for and which ones would be classified as object obstructions.

Subsequent windows 702, 704 and 706 within the windows 708 may be processed in a similar method. As the windows 708 are processed, or sliding, further objects 814 may be identified such that the GAN 400 may more easily recognize them within the environment 104. That is, as the windows 708 are processed, the GAN 400 may understand the background of where the vehicle 100 is traveling.

Figure 11:
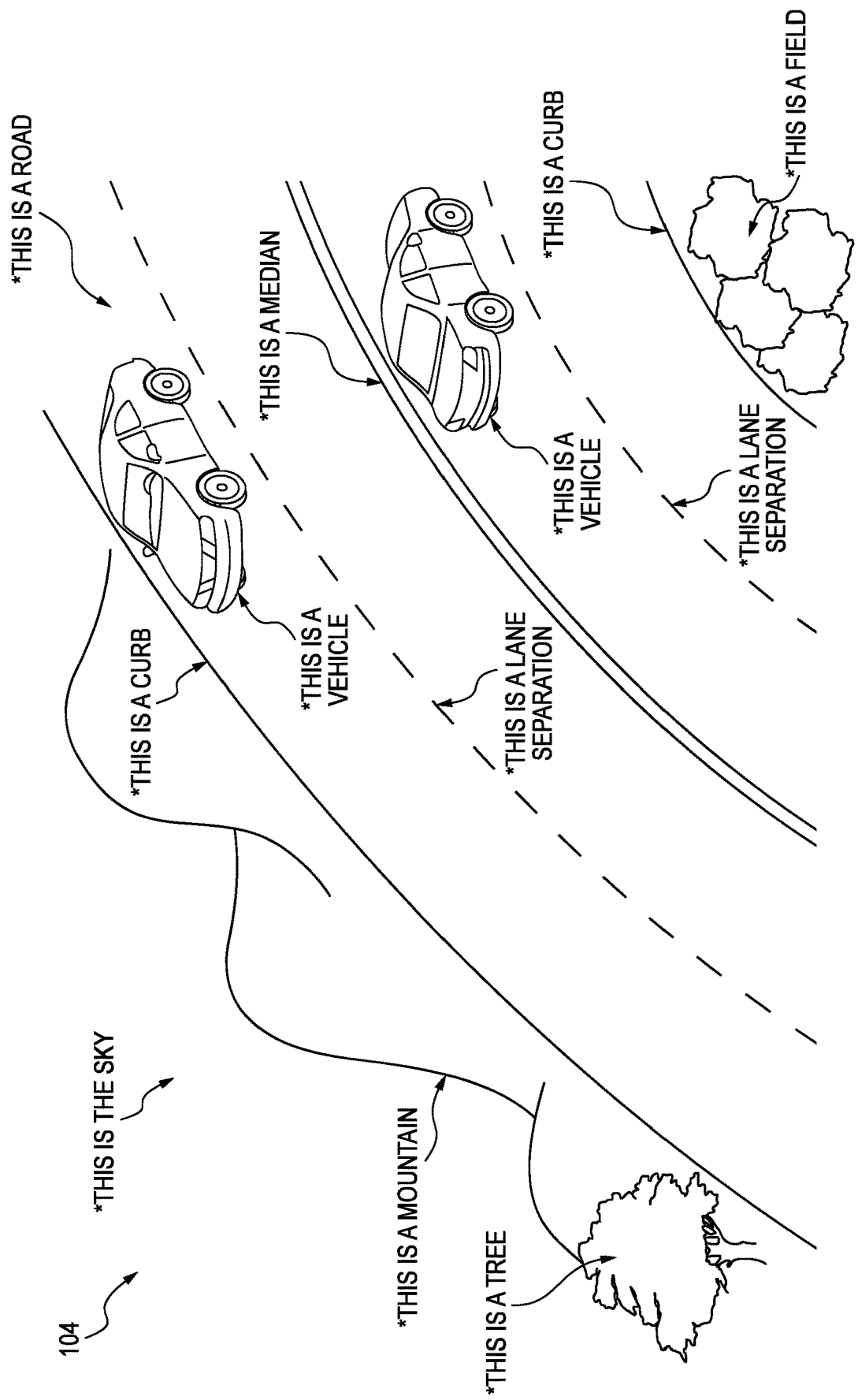
FIG. 11 is a schematic diagram of an illustrative environment where the neural network has identified environmental objects within the second window in accordance with one aspect of the present disclosure.

Turning to FIG. 11, a schematic diagram of an illustrative environment 104 where the neural network has identified environmental objects 814 within the second window 602 in accordance with one aspect of the present disclosure is provided. At this point, the GAN 400, or other neural network, may have been trained to classify the environmental objects 814 through the fake images 406 and real images 408. These objects 814, or at least a partial set of them, may have been determined from the first window 102.

Classifying object obstructions may be performed in the second window 602. For example, other vehicles 114 may be identified as object obstructions. By identifying these vehicles 114, they may be marked and flagged for removal through bounding boxes. In one embodiment, these vehicles 114 may be identified by previous images fed into the GAN 400, or other neural network. For example, the lines, coloring or look of the vehicle 114 may be determined and classified as an actual vehicle 114. Images of a front, side, back or other angle of the vehicle 114 may have been previously used and fed into the GAN 400. An absolute copy of the vehicle 114 may not be needed to train the GAN 400 to recognize the vehicle 114. Rather, the GAN 400 may identify the vehicle 114 through portions or partial pieces of the images that were used to train the GAN 400.

While the vehicles 114 were determined to be object obstructions, other object obstructions may be removed from the second window 602 to generate the rendered window 202. For example, pedestrians or bicyclist may be removed within an urban environment. This advantageously may remove distractions or irritations of the operator. Power lines or telephone poles may also be removed as they may be unsightly. Other environmental objects 814 may be removed and may vary depending on the operator's preferences.

Figure 12:
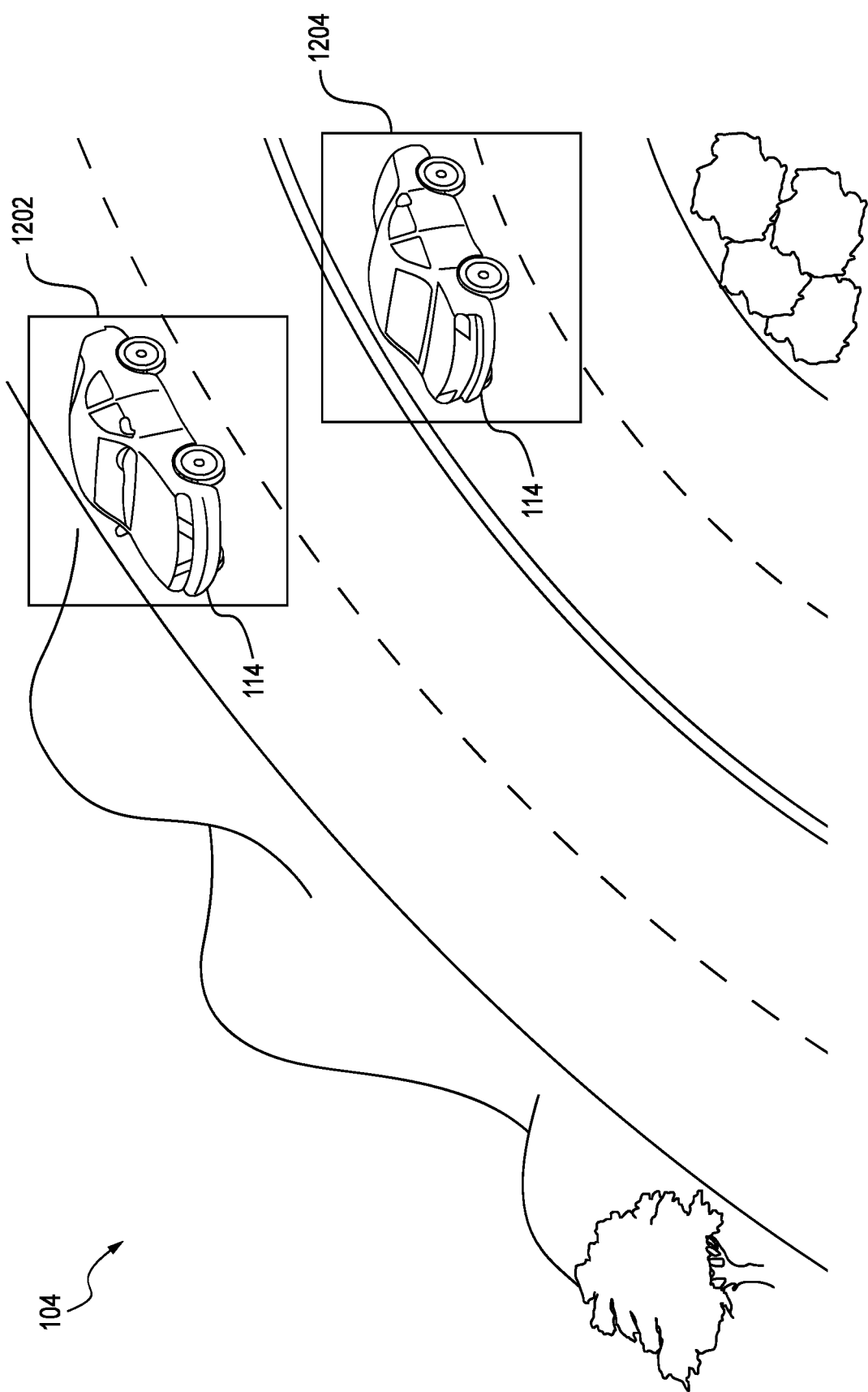
FIG. 12 is a schematic diagram of the illustrative environment where the object obstructions have been identified by bounding boxes in accordance with one aspect of the present disclosure.

FIG. 12 is a schematic diagram of the illustrative environment 104 where the object obstructions have been identified by bounding boxes 1202 and 1204 in accordance with one aspect of the present disclosure. While bounding boxes 1202 and 1204 may be employed by the computer system, other types of methods may be used to classify the object obstructions within the second window 602. For example, other shapes may be used instead of a box such as a triangle (to remove trees), oval (to remove rock formations) or the like.

After identifying the objects 814 as an object obstruction, the bounding boxes 1202 and 1204 may be placed over them. The bounding boxes 1202 and 1204 may be defined by the farthest left upper hand corner to the farthest right lower hand corner. The bounding boxes 1202 and 1204 may fit around the other vehicles 114, or other object obstructions that the operator wishes to remove including motorcyclist, bicyclist or pedestrians.

Figure 13:
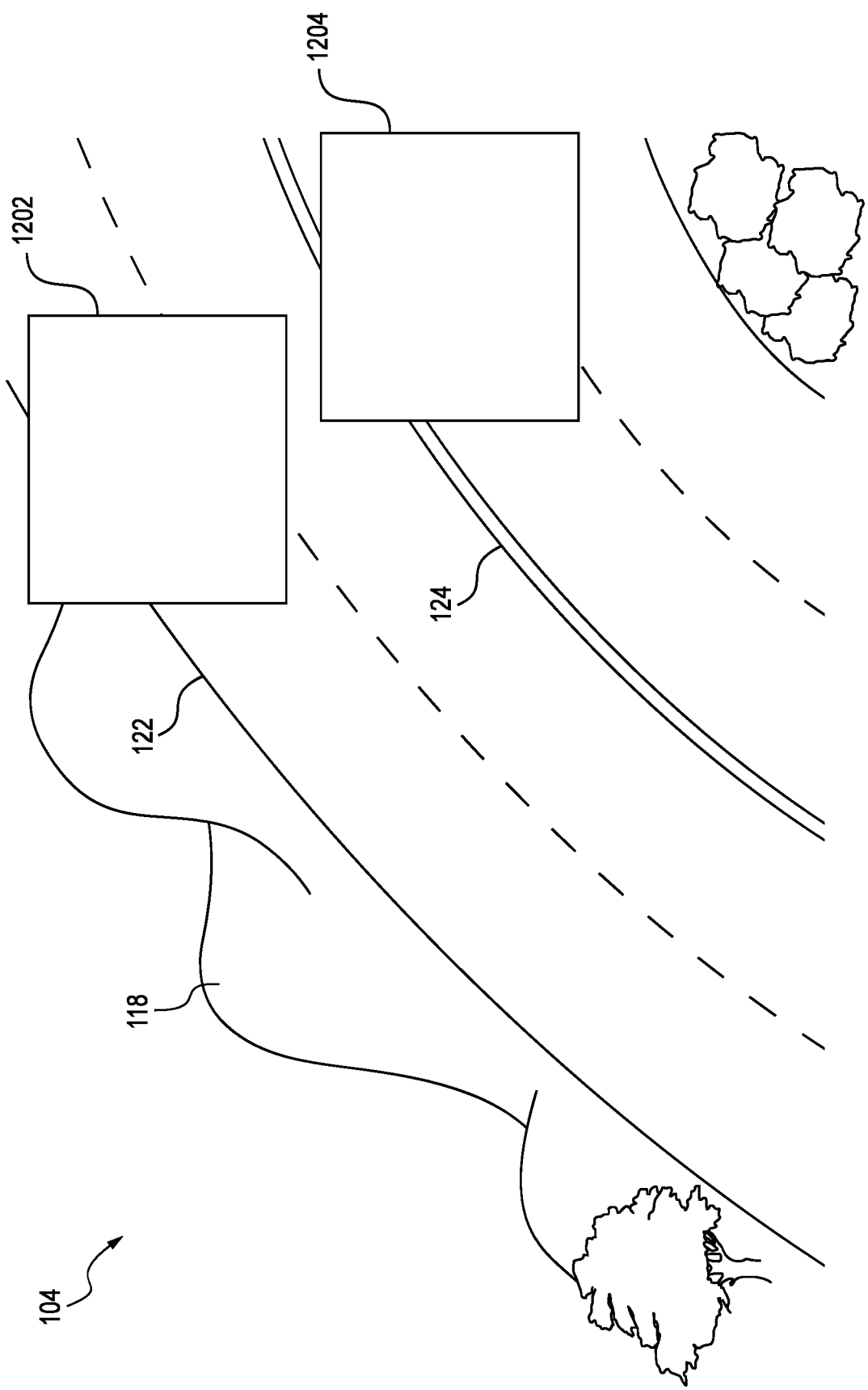
FIG. 13 is a schematic diagram of the illustrative environment where the object obstructions have been removed along with environmental objects within the bounding boxes in accordance with one aspect of the present disclosure.

FIG. 13 is a schematic diagram of the illustrative environment 104 where the object obstructions have been removed along with environmental objects within the bounding boxes 1202 and 1204 in accordance with one aspect of the present disclosure. As shown, the first bounding box 1202 may have been used to remove another vehicle 114. The entire area may have been removed from the second window 602 leaving a blank area. The curb 122 along with the vehicle 114 may have been removed along with a portion of the mountain 118.

Content within the second bounding box 1204 may also be removed to eliminate the other vehicle 114 within the second window 602. During this removal, and because of the bounding box 1204, the median 124 may have been eliminated.

Figure 14:
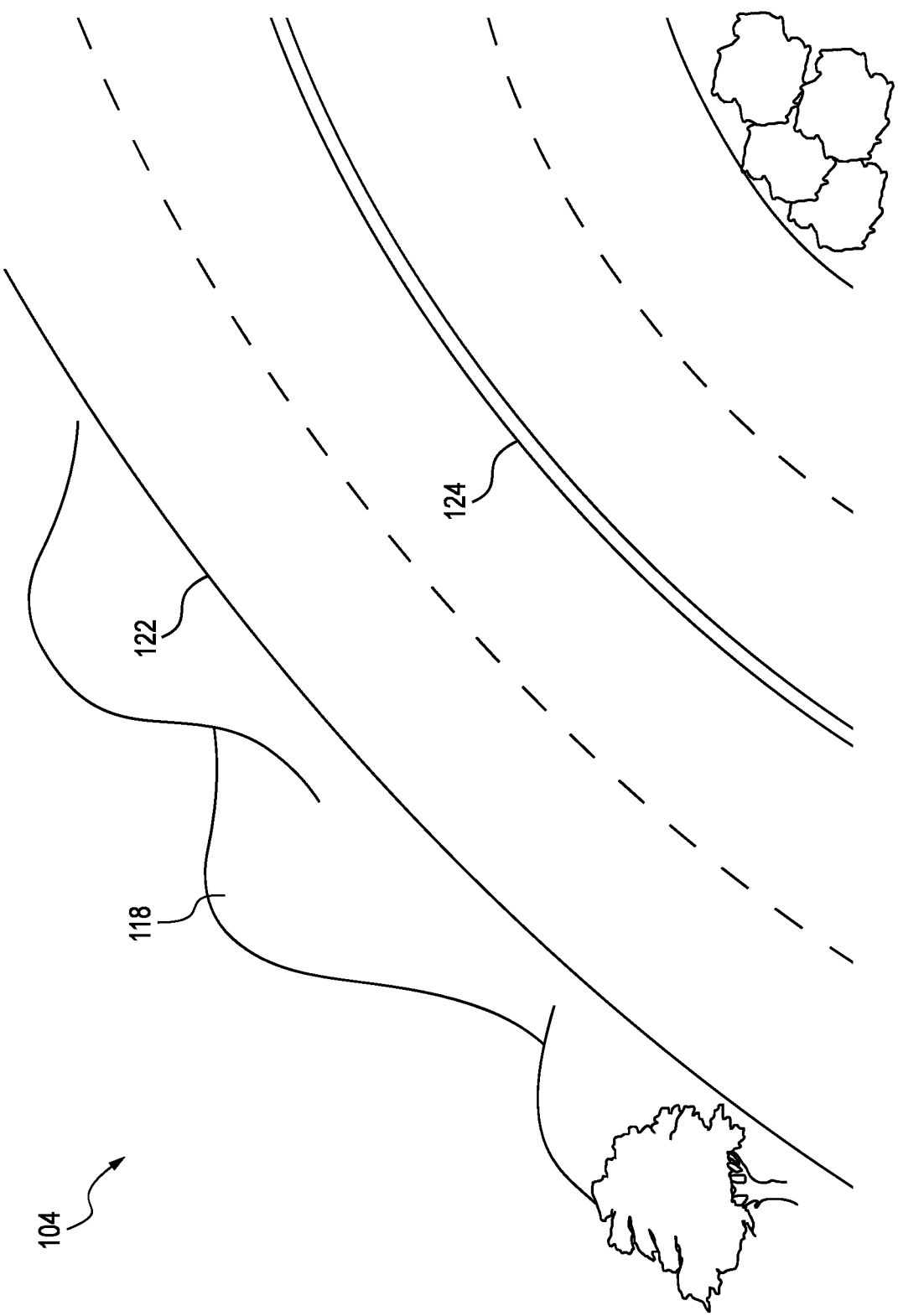
FIG. 14 is a schematic diagram of the illustrative environment where the object obstructions have been removed along and replaced with environmental objects generated by the neural network to form the first rendered window in accordance with one aspect of the present disclosure.

To create a proper first rendered window 202, the GAN 400 may superimpose environmental objects 814 defined by the neural network into the blank areas left by the bounding boxes 1202 and 1204 of the second window 602. FIG. 14 is a schematic diagram of the illustrative environment 104 where the object obstructions have been removed along and replaced with environmental objects 814 generated by the neural network in accordance with one aspect of the present disclosure. To achieve this, the bounding boxes 1202 and 1204, and the edges of them, may be used to understand the scene. Images sets, or pieces of them, may be used from the GAN 400, or other neural network, to fill in the bounding boxes 1202 and 1204.

Images within the bounding boxes 1202 and 1204 may be recreated through the GAN 400, or other neural network, by compiling one or more images that may match respective environmental objects 814 outside the bounding boxes 1202 and 1204 of the second window 602 along with the knowledge of objects 814 within the first window 102. For example, and with respect to the first bounding box 1202, the GAN 400 may determine that the curb 122 is missing or has been deleted along with the mountain 118. Based on the area outside the bounding box 1202, the area within may be compiled based on previously trained images, or portions thereof. The GAN 400 may use its understanding of the scene to recreate the area as shown. This may include recreating the mountain 118 and curb 122 and other environmental objects 814 that may be missing based on its database of training images.

The object obstruction within the second bounding box 1204 when removed may also have eliminated the median 124 as well as other road features. Again, the GAN 400, or other neural network, may compile one or more images, or portions thereof, that may match respective environmental objects 814 outside the bounding boxes 1202 and 1204 of the second window 602 along with the knowledge of objects 814 within the first window 102 to fill the area in. The GAN 400 may recognize that road features are missing and then fill them in along with the median 124. Thus, the information within the bounding boxes 1202 and 1204, may be compiled and regenerated through the GAN 400 to create the first rendered window 202.

Figure 15:
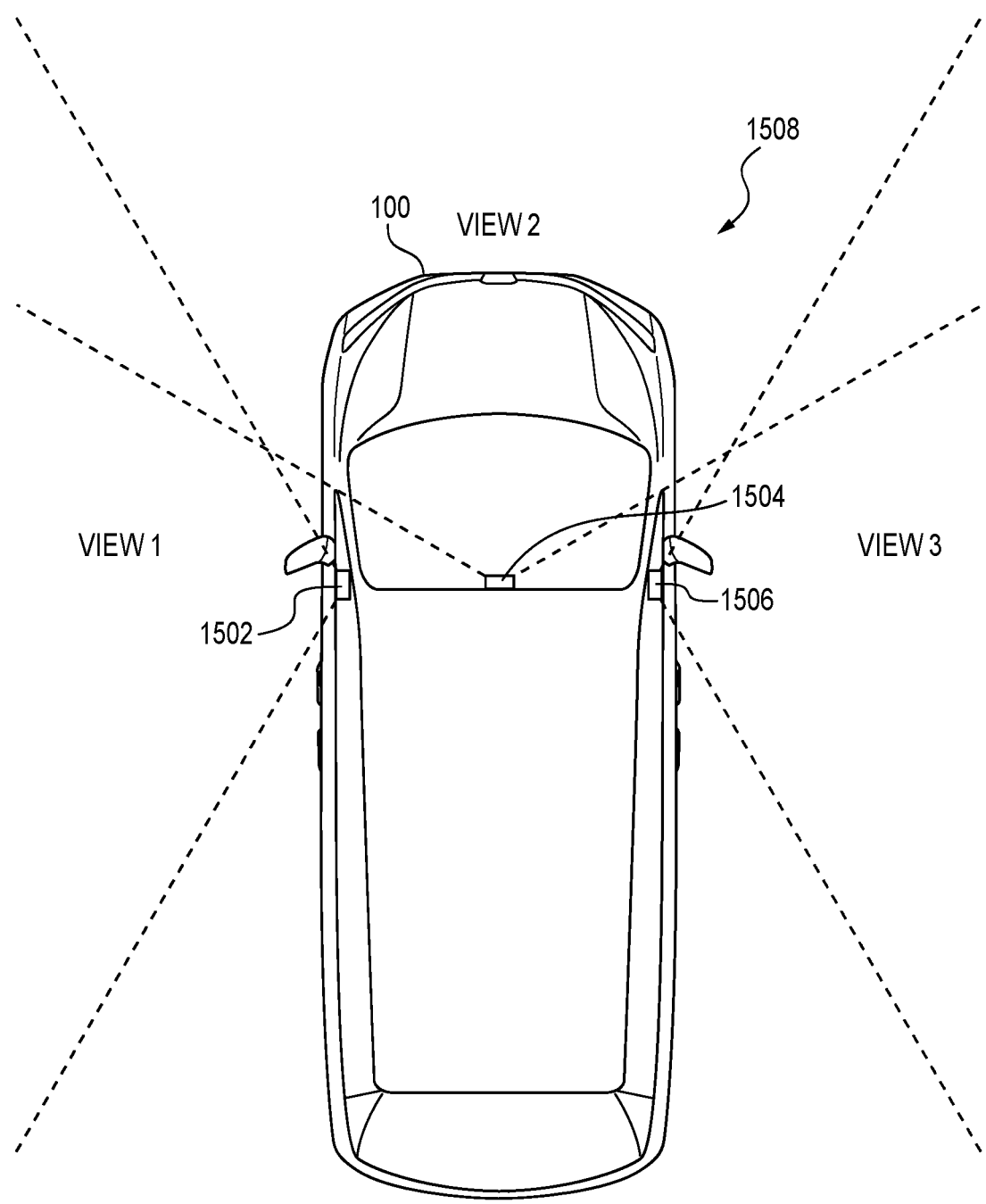
FIG. 15 is a schematic diagram of an illustrative autonomous vehicle showing camera placements for capturing windows for scene creation in accordance with one aspect of the present disclosure.

With reference now to FIG. 15, a schematic diagram of an illustrative autonomous vehicle 100 showing camera placements for capturing windows 708 for scene creation in accordance with one aspect of the present disclosure is provided. In one embodiment, the vehicle 100 may include a first camera 1502, second camera 1504 and third camera 1506 (collectively cameras 1508). Fewer or more cameras 1508 may be provided on the inside or outside of the vehicle 100 and the placement should not be limited to that shown.

The first camera 1502 may be fixed to the left side of the vehicle 100 whereby it may capture a left side-to-front view, View 1, of the vehicle 100. In one embodiment, the first camera 1502 may be placed on the side mirror of the vehicle 100. The third camera 1506 may similarly be placed on the side mirror, but the right mirror of the vehicle 100. The third camera 1506 may provide a right side-to-front view, View 3. The second camera 1504 may be positioned on front of the vehicle 100 and in one embodiment, within the interior rearview mirror assembly. The second camera 1504 may provide a front view, View 2.

The computer system, in one embodiment, may be able to piece together each of the views, that is, View 1, View 2 and View 3. These views may be compiled or placed together to recreate one of the windows 708 described above. The cameras 1508 may be calibrated such that they may receive the video at the same time so that they may processed together by the GAN 400, or other neural network, to render new windows. For example, each of the views may be time stamped and processed together by the computer system.

While a side-to-front-to-side view may be gathered within the windows 708, other views may exist. For example, additional cameras 1508 may be provided to capture back views of the vehicle 100. These additional views may be pieced together such that each of the views may be in-sync with one another when processed by the GAN 400, or other neural network. Through additional cameras 1508, along with more output devices, a fully immersive environment 104 may be created within the vehicle 100.

Figure 16:
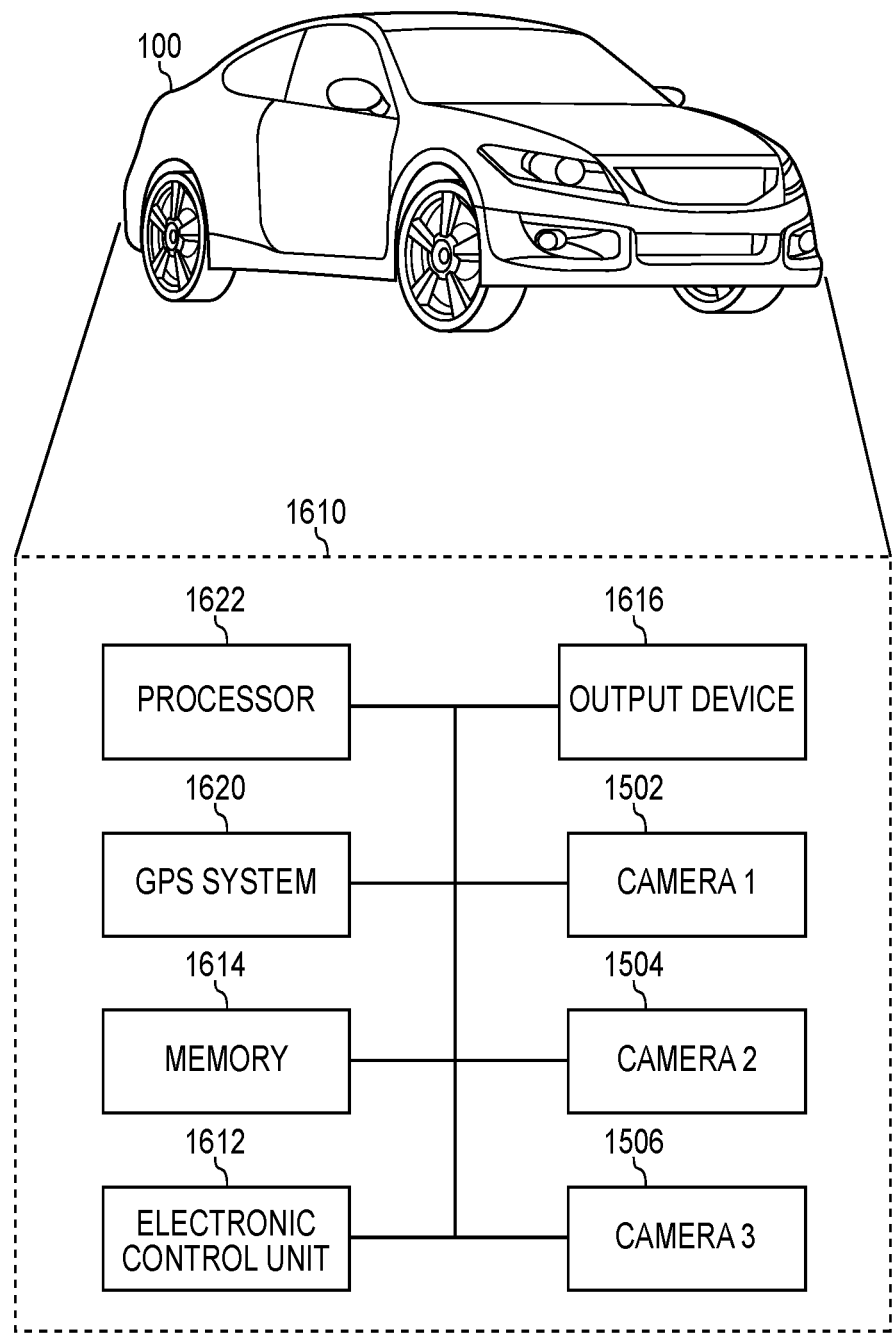
FIG. 16 is a schematic diagram of an illustrative computer system for the autonomous vehicle for creating the rendered window in accordance with one aspect of the present disclosure.

FIG. 16 is a schematic diagram of an illustrative computer system 1610 for the autonomous vehicle 100 for creating the rendered window 202 in accordance with one aspect of the present disclosure. The computer system 1610 may reside within the vehicle 100 or alternatively, be outside the vehicle, for example, in the cloud. The components of the computer system 1610, as well as the components of other systems, hardware architectures and software architectures discussed herein, may be combined, omitted or organized into different architectures for various implementations. However, the example embodiments of the disclosure discussed herein focus on the vehicle environment, with corresponding system components and related methods.

As shown, the vehicle 100 may generally include an electronic control unit (ECU) 1612 that may operably control a plurality of vehicle systems. The vehicle systems may include, but are not limited to, rendering windows, HVAC systems, vehicle audio systems, vehicle video systems, vehicle infotainment systems, vehicle telephone systems, and the like. The vehicle 100 may include a vehicle GPS system 1620 that may also be connected to the ECU 1612 to provide GPS data 710, which as described earlier may provide for a better understanding of environmental objects 814.

The ECU 1612 may include internal processing memory, an interface circuit, and bus lines for transferring data, sending commands, and communicating with the vehicle systems. Generally, the ECU 1612 may include a processor and memory (not shown). The vehicle 100 may also include a bus for sending data internally between the various components of the computer system 1610.

The computer system 1610 may include memory 1614 which generally includes both volatile memory such as RAM and non-volatile memory such as ROM, flash memory or the like. The non-volatile portion of the memory 1614 may be used to store persistent information which should not be lost when the vehicle 100 is powered down. To implement logic residing on the memory 1614, the computer system 1610 may include at least one processor 1622. The processor 1622 may implement instructions within the memory 1614 for executing processes. For example, these processes may include receiving the windows 708 from the cameras 1508 and rendering new windows while removing object obstructions. The memory 1614, as well as the processor 1622, may be local to the computer system 1610 on the vehicle 100, or remote therefrom.

As described above, the computer system 1610 may provide the output in the form of virtual reality displays on at least one output device 1616. The virtual reality display may be a Heads Up Display (HUD), a hologram projection system, a liquid crystal display (LCD) or the like. The virtual reality displays may display the rendered windows with the removed object obstructions. The virtual reality display may also display environmental objects in the autonomous vehicle's environment 104 including roads, buildings, pedestrian or the like. Information such as maps, navigation routes or other scenery may be provided through the display.

The vehicle 100 may include the first camera 1502, second camera 1504 and third camera 1506, as described above. The cameras 1508 may be used for obtaining images or videos of the environment 104 surrounding the vehicle 100, in particular, the views provided to left portion 106, front portion 108 and right portion 110 of the vehicle 100. In one embodiment, the cameras 1508 may be digital cameras capable of obtaining high quality digital images or video. The cameras 1508 may be calibrated with respect to the vehicle 100. For example, the cameras 1508 may be calibrated by obtaining images from three directions and then pieced together as to form a single window 708.

Figure 17:
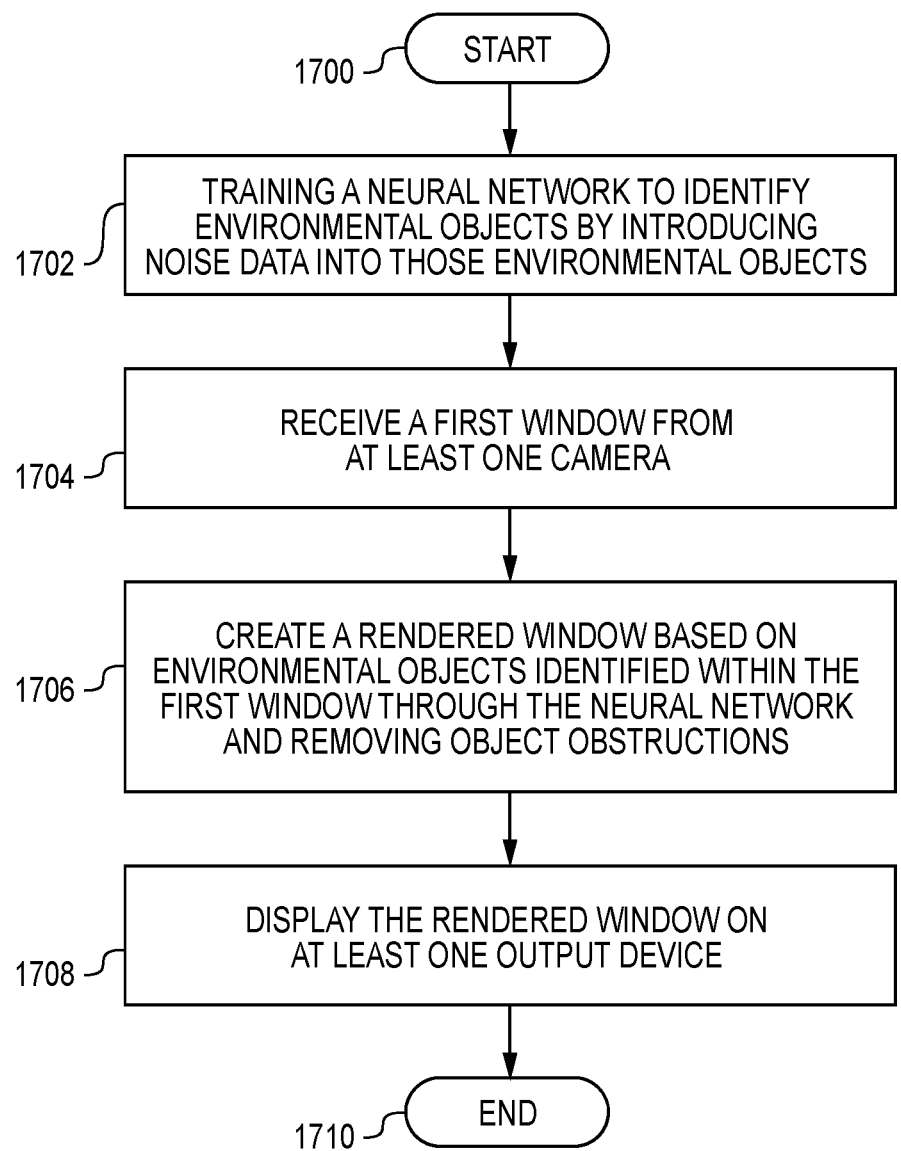
FIG. 17 is a schematic diagram of an illustrative flow chart showing processes for creating the rendered window in accordance with one aspect of the present disclosure.

FIG. 17 is a schematic diagram of an illustrative flow chart showing processes for creating the rendered window 202 in accordance with one aspect of the present disclosure. Fewer or more processes may be used and those shown are for illustrative purposes. The processes may be used for the generation of one rendered window 202. Additional rendered windows may be created through similar, or the same, processes. The processes may be implemented on a remote system, such as the cloud, or locally on the computer system 1610. The processes may begin at block 1700.

At block 1702, the GAN 400 may be trained to identify environmental objects 814 by introducing noise into those environmental objects 814. The GAN 400, provided above or other neural network, may receive both fake images 406 and real images 408. By tricking or playing games with the GAN 400, the GAN 400 may become better at classifying images and thereby identifying environmental objects 814 that may be received within the incoming windows 708.

After training the GAN 400, the GAN 400 may receive a first window 102 from the cameras 1508 on the vehicle 100 at block 1704. Three cameras 1508 may have been used to take images or videos on the exterior of the vehicle 100. The GAN 400 may identify environmental objects 814 within the first window 102.

At block 1706, a rendered window 202 may be created based on environmental objects 814 identified within the first window 102 through the neural network with removed object obstructions. The GAN 400, by previously identifying the objects 814, may now use them to generate the rendered window 202 by placing bounding boxes around object obstructions and removing the information within them. The GAN 400 may then superimpose environmental objects 814 defined by the neural network into the areas removed by the bounding boxes 1202 and 1204 of the second window 602. That is, the GAN 400 may compile one or more images that match respective environmental objects outside the bounding boxes 1202 and 1204 of the second window 602 to fill them in using information from those previously defined objects 814 within the first window 102.

The rendered window 202 may then be displayed on at least one output device 1616 at block 1708. The output device 1616 may include three virtual reality displays. These displays may cover the left portion 106, front portion 108 and right portion 110 of the vehicle 100 such that the operator may be immersed into the recreated scenery. The processes may end at block 1710.

Figure 18:
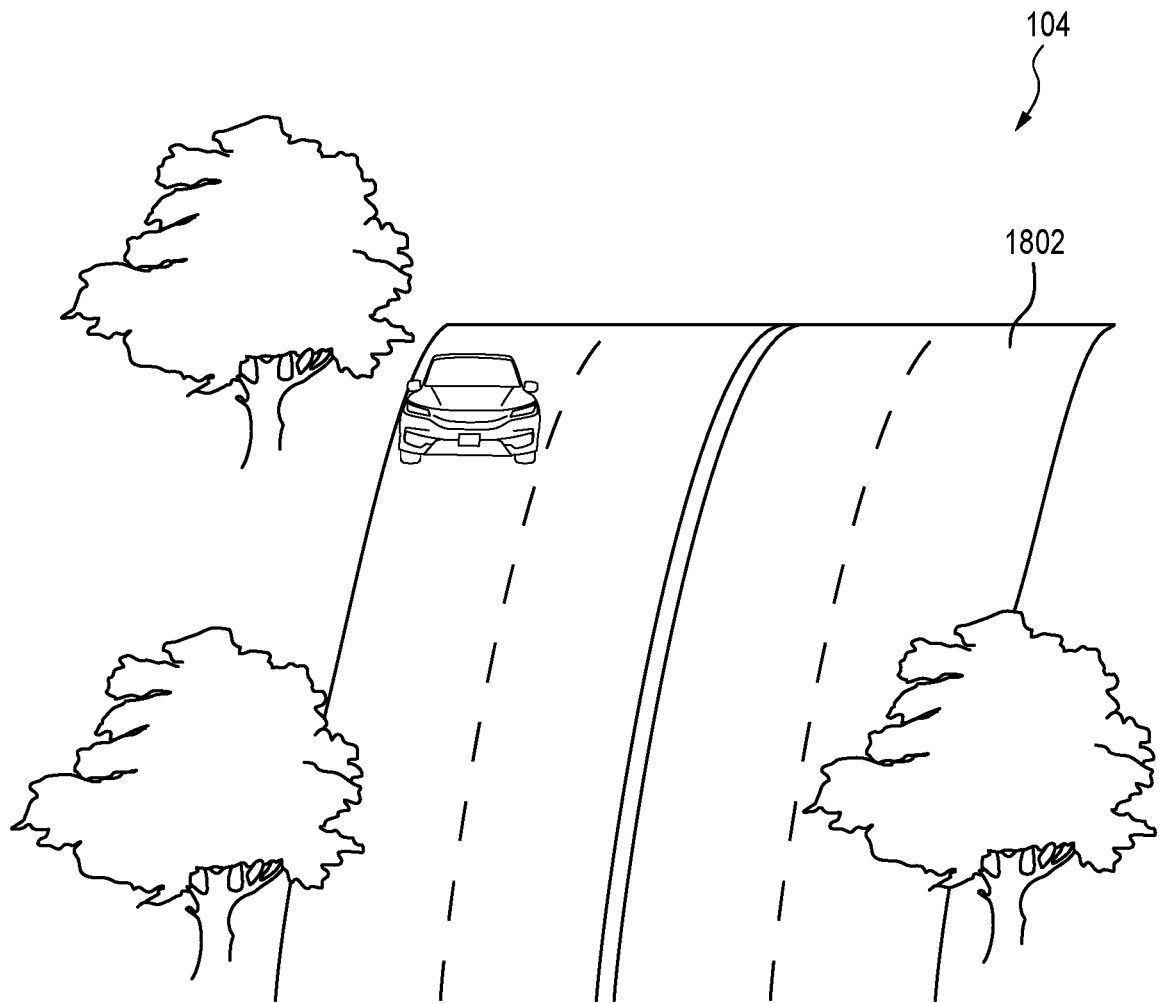
FIG. 18 is a schematic diagram of an illustrative environment where the autonomous vehicle travels over a hill in accordance with one aspect of the present disclosure.

With reference to FIG. 18, a schematic diagram of an illustrative environment 104 where the autonomous vehicle 100 travels over a hill 1802 in accordance with one aspect of the present disclosure is provided. The hill 1802 may present a special circumstance to generating the rendered window 202. As the vehicle 100 travels up the hill 1802, the environment 104 may change quite rapidly and the vehicle 100 may not be able to detect objects 814 beyond the hill 1802.

Figure 19:
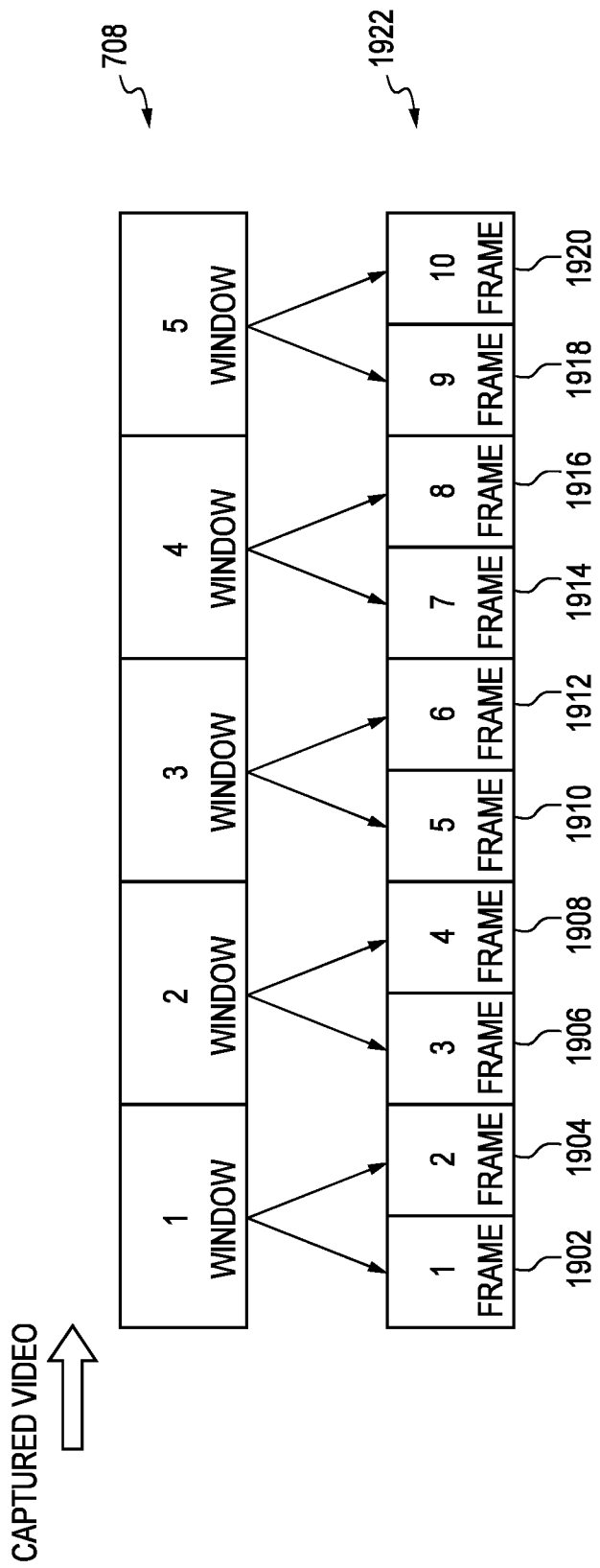
FIG. 19 is a schematic diagram of an illustrative process for breaking the windows into smaller partitions to adjust for hill scenarios in accordance with one aspect of the present disclosure.

Previously, the windows 708 may have been captured in one minute intervals. To overcome the shorter time frames in which the environment 104 is changing, the windows 708 may be taken in smaller increments. For example, the windows 708 may be split in half. FIG. 19 is a schematic diagram of an illustrative process for breaking the windows 708 into smaller partitions to adjust for hill scenarios in accordance with one aspect of the present disclosure. In the case of an uphill portion, environmental objects 814 may not be seen behind the hill 1802. Instead of taking every minute to create a window 708, the windows 708 may be broken down into smaller windows 1922.

To achieve this, a first frame 1902, second frame 1904, third frame 1906, fourth frame 1908, fifth frame 1910, sixth frame 1912, seventh frame 1914, eighth frame 1916, ninth frame 1918 and tenth frame 1920 (collectively frame s 1922) may represent smaller portions or smaller time periods used to understand the environment 104. Instead of one minute periods, the frames 1922 may be broken into thirty seconds. By breaking the windows 708 into smaller frames 1922, the GAN 400 may process environmental objects 814 quicker corresponding to the constant changing environment 104 outside the vehicle 100.

Taking smaller time periods may be applied to other scenarios. For example, the GAN 400, or other neural network, may begin to use the smaller windows 1922 at bends around a mountain. By doing this, environmental objects 814 may be identified and processed quicker such that newly rendered windows may be made. Furthermore, smaller windows 1922 may also be applied to urban environments 104. Breaking the windows into smaller pieces may allow the GAN 400 to understand environmental objects 814 quicker and then superimpose images into the bounding boxes.

In typical embodiments, rendering new windows may end at the arrival destination. Alternatively, or in combination, the rendered windows may end when the vehicle 100 has stopped for a long period of time. For example, the computer system 1610 may terminate processing of the windows 708 when the vehicle 100 stops at red signals, trains, emergency vehicles, or the like. Advantageously, the user may become more aware of their surroundings and the reasoning of why they stopped.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vehicle, comprising:
    at least one camera;
    at least one output device;
    at least one processor; and
    a memory operatively coupled to the at least one processor, the memory storing program instructions that when executed by the at least one processor, causes the at least one processor to:
        train a neural network to identify environmental objects by introducing noise data into the environmental objects;
        receive a first window from the at least one camera;
        identify the environmental objects within the first window through the neural network;
        receive a second window from the at least one camera;
        identify object obstructions within the second window based on the neural network;
        generate bounding boxes around the identified object obstructions within the second window;
        eliminate the area within the bounding boxes of the second window;
        superimpose the environmental objects identified within the first window defined by the neural network into the area of the second window to generate a rendered window; and
        display the rendered window on the at least one output device.

2. The vehicle of claim 1, wherein the neural network is a generative adversarial network (GAN), and the noise data comprises high frequency noise and low-frequency noise.

3. The vehicle of claim 1, wherein the program instructions that when executed by the at least one processor, causes the at least one processor to
    receive a plurality of windows defining the environmental objects to train the neural network.

4. The vehicle of claim 1, wherein the program instructions that when executed by the at least one processor, causes the at least one processor to
    compile one or more images that match respective environmental objects outside the bounding boxes of the second window to superimpose the environmental objects.

5. The vehicle of claim 1, wherein the first window and the second window comprise three field of views from three cameras.

6. The vehicle of claim 1, wherein the at least one output device comprises at least three virtual reality displays aligned with a front window, a left window, and a right window of the vehicle.

7. The vehicle of claim 1, wherein the program instructions that when executed by the at least one processor, causes the at least one processor to
    classify the noise data based on an environment traversed by the vehicle, wherein in a case where the environment traversed by the vehicle is an urban environment, the noise data includes high frequency noise, and
    in a case where the environment traversed by the vehicle is a rural environment, the noise data includes low-frequency noise.

\* \* \* \* \*